(12) United States Patent
Washeleski et al.

(10) Patent No.: US 7,055,505 B2
(45) Date of Patent: Jun. 6, 2006

(54) VEHICLE FUEL MANAGEMENT SYSTEM

(75) Inventors: John Washeleski, Cadillac, MI (US); Randall L. Perrin, Cadillac, MI (US); John E. Mitchell, Falmouth, MI (US)

(73) Assignee: Nartron Corporation, Reed City, MI (US)

( * ) Notice: Subject to any disclaimer, the term of this patent is extended or adjusted under 35 U.S.C. 154(b) by 0 days.

(21) Appl. No.: 11/103,096

(22) Filed: Apr. 11, 2005

(65) Prior Publication Data

US 2005/0178365 A1  Aug. 18, 2005

Related U.S. Application Data

(62) Division of application No. 10/157,363, filed on May 29, 2002, now Pat. No. 6,877,488.

(51) Int. Cl.
*F02M 33/02* (2006.01)

(52) U.S. Cl. .................. 123/519; 123/520

(58) Field of Classification Search ............... 123/516, 123/518, 519, 520
See application file for complete search history.

(56) References Cited

U.S. PATENT DOCUMENTS

| | | | |
|---|---|---|---|
| 3,710,771 A | 1/1973 | Cinquegrani | |
| 4,248,194 A | 2/1981 | Drutchas et al. | |
| 4,459,943 A | 7/1984 | Goodman | |
| 4,763,611 A | 8/1988 | Kobayashi et al. | |
| 4,811,709 A | 3/1989 | Braun et al. | |
| 4,926,829 A | 5/1990 | Tuckey | |
| 5,089,144 A | 2/1992 | Ozkahyaoglu et al. | |
| 5,133,323 A | 7/1992 | Treusch | |
| 5,237,975 A | 8/1993 | Betki et al. | |
| 5,284,119 A | 2/1994 | Smitley | |
| 5,361,742 A | 11/1994 | Briggs et al. | |
| 5,373,822 A | 12/1994 | Thompson | |
| 5,454,697 A | 10/1995 | Nakanishi | |
| 5,505,180 A | 4/1996 | Otterman et al. | |
| 5,579,739 A | 12/1996 | Tuckey et al. | |
| 5,843,212 A * | 12/1998 | Nanaji | 96/4 |
| 5,850,819 A * | 12/1998 | Kunimitsu et al. | 123/520 |
| 5,901,750 A | 5/1999 | Kozinski | |
| 5,918,282 A * | 6/1999 | Schwager et al. | 73/756 |
| 6,123,060 A * | 9/2000 | Wild et al. | 123/520 |
| 6,182,693 B1 | 2/2001 | Stack et al. | |
| 6,223,731 B1 | 5/2001 | Yoshiume et al. | |
| 6,279,541 B1 | 8/2001 | Doane et al. | |
| 6,289,947 B1 | 9/2001 | Heimbrodt et al. | |

(Continued)

FOREIGN PATENT DOCUMENTS

EP  1 031 725  8/2000

(Continued)

*Primary Examiner*—Thomas Moulis
(74) *Attorney, Agent, or Firm*—Watts Hoffmann Co., LPA

(57) ABSTRACT

An integrated fuel management system and method for controlling the fuel storage and delivery in a vehicle. The fuel management system includes a fuel storage tank for storing fuel in a vehicle, a vapor collection canister located within the fuel storage tank, a vent actuator coupled to the vapor collection canister for venting gas from the canister during a vent operation, and a purge actuator is coupled to the vapor collection canister for purging fuel vapor from the vapor collection canister during a purge operation. A variable speed fuel pump is disposed within the fuel storage tank for delivering fuel to a fuel delivery line for an engine. The fuel management system has a controller provided in a module disposed in communication with the fuel for controlling the amount of fuel pumped with the variable speed fuel pump to deliver fuel to the fuel delivery line and further controlling the purge and vent actuators.

5 Claims, 20 Drawing Sheets

U.S. PATENT DOCUMENTS

| | | |
|---|---|---|
| 6,302,144 B1 | 10/2001 | Graham et al. |
| 6,305,362 B1 | 10/2001 | Kitamura et al. |
| 6,354,280 B1 | 3/2002 | Itakura et al. |
| 6,360,729 B1 * | 3/2002 | Ellsworth .................. 123/518 |
| 6,374,811 B1 | 4/2002 | Mancini |
| 6,382,191 B1 * | 5/2002 | Curran et al. ............... 123/518 |
| 6,435,164 B1 | 8/2002 | Kaiser et al. |

FOREIGN PATENT DOCUMENTS

| | | |
|---|---|---|
| EP | 1 059 430 | 12/2000 |
| EP | 1 155 896 | 11/2001 |
| JP | 06280706 | 10/1994 |
| JP | 2002122053 | 4/2002 |
| WO | WO 98/27333 | 6/1998 |

* cited by examiner

VEHICLE FUEL MANAGEMENT SYSTEM

This is a divisional of Ser. No. 10/157,363 filed May 29, 2002 now U.S. Pat. No. 6,877,488

BACKGROUND OF THE INVENTION

The present invention generally relates to on-board fuel storage and delivery to an engine in a vehicle and, more particularly, relates to vehicle fuel management for controlling fuel storage and delivery to the engine.

Automotive vehicles are typically powered by an internal combustion engine that converts the chemical energy of a fuel (e.g., gasoline) to mechanical energy for driving a powertrain which, in turn, propels the vehicle via road wheels. Additionally, some of the mechanical energy is also converted to electrical energy via an alternator and is stored in a battery and used to power various electrically operated devices. Vehicles are being equipped with increasing numbers of electrically powered devices, all of which consume energy. Thus, it is desirable to enhance the efficiency of the electrically powered devices in order to maximize the overall energy efficiency of the vehicle.

Automotive vehicles employ a fuel storage tank and a fuel delivery system that delivers a controlled amount of fuel from the fuel storage tank to one or more fuel rails having fuel injectors for dispensing the fuel into the internal combustion engine. At the engine, the fuel injectors inject a controlled mixture of the fuel and air into the individual engine cylinders. Many conventional fuel delivery systems typically employ a single speed on/off fuel pump for pumping pressurized fuel from the fuel storage tank to the fuel rail which, in turn, supplies the pressurized fuel to the individual fuel injectors. The fuel pump is powered by an electric motor that is operated such that the motor is either off (de-energized) to provide no pumping action or the motor is on (energized) to pump fuel at a fixed pumping speed. The fuel output from the pump flows through a mechanical regulator that regulates the amount of fuel delivered to the fuel rail at a predetermined pressure. Pumped fuel that is not delivered to the fuel rail is returned to the fuel storage tank via a return path from the mechanical regulator.

Many conventional fuel delivery system fuel pumps are continuously operated at a fixed speed as long as the ignition key is in the on position, regardless of the engine fuel demands. The fuel pump generates an audible noise when energized at the normal fixed speed. This results in a continuous audible noise which can be noticeable to vehicle occupants, particularly when the engine is operated at low engine load demands, e.g., engine idle speed. Continued full speed operation of the fuel pump further consumes electrical energy, which could otherwise be made available elsewhere to enhance the vehicle energy efficiency. Additionally, the return of a large amount of excessive fuel through the regulator to the fuel storage tank may cause heating of the fuel that, in turn, creates unwanted gas vapor, which adds to evaporative emissions, and which then must be vented through a charcoal canister. Reducing the fuel pump speed reduces the vapor, which reduces the emissions to reduce the global warming and ozone depletion potentials caused by the fuel vapors.

Fuel delivery systems have been proposed that employ a variable speed fuel pump electrically controlled to increase and decrease pump speed. One example of a fuel delivery system is disclosed in U.S. Pat. No. 4,926,829, entitled "PRESSURE-RESPONSIVE FUEL DELIVERY SYSTEM." The fuel delivery system described in the aforementioned patent employs a pressure regulator in a fuel return line, and a pressure sensor for monitoring pressure in the return line. The fuel pump is energized at low or high levels depending on the fuel back-pressure in the return line. Many such fuel delivery systems are generally complex and costly. It is desirable to provide for a fuel delivery system having reduced complexity and cost.

Mounted within the fuel storage tank is a carbon (e.g., charcoal) canister for collecting fuel vapor to reduce evaporated emissions. The vapor collection canister has a fuel vapor vent for venting pressurized gas from within the fuel storage tank, and also has a fuel vapor purge actuator for purging the collected fuel vapor from the vapor collection canister for burning in the engine. The fuel vapor vent and purge actuator are periodically operated in response to command control signals generated by the engine control module. The fuel collection canister is typically periodically purged, without regard to measuring the actual amount of fuel vapors collected therein. During a fuel fill operation, for example, when the fuel storage tank is excessively filled with fuel, the fuel canister may rapidly become saturated, hence requiring a purge operation. The fuel fill tube leading to the fuel tank generally includes a mechanical float valve which shuts off the conventional fuel fill dispensing nozzle upon reaching a predetermined fuel tank pressure. However, it is possible to continue to dispense incremental amounts of fuel in the fuel storage tank, thereby leading to saturation of the vapor collection canister.

The conventional fuel pump motor is generally controlled (on or off) in response to a command signal received from the vehicle engine control module (ECM) (a/k/a, engine control unit) which performs a multitude of vehicle functions generally related to engine operation. The engine control module also controls other devices related to the storage and delivery of fuel to the engine by outputting on/off command signals to various devices to control the individual devices. Conventional fuel delivery systems rely primarily upon the engine control module to control the various fuel storage, delivery, and management functions by controlling such devices on and off, but do not provide for optimal integration of fuel delivery functions.

Accordingly, it is therefore desirable to provide for a fuel management system that overcomes deficiencies of prior known vehicle systems for controlling the fuel storage and delivery of fuel to the engine on the vehicle. In particular, it is desirable to provide for an integrated system of managing fuel storage and delivery within a vehicle. It is also desirable to provide for a cost affordable fuel delivery system that provides enhanced energy efficiency, reduced audible noise, and reduced wiring. It is further desirable to provide for a fuel delivery system that offers enhanced fuel management integration including, but not limited to, fuel tank vent, fuel vapor purge and fuel fill operations.

SUMMARY OF THE INVENTION

According to one aspect of the present invention, an integrated fuel management system and method are provided that offer cost affordable controls for controlling the fuel storage and delivery in a vehicle. The fuel management system includes a fuel storage tank for storing fuel in a vehicle, and a vapor collection canister coupled to the fuel storage tank for collecting fuel vapor. A vent actuator is coupled to the vapor collection canister for venting gas from the canister during a vent operation. A purge actuator is also coupled to the vapor collection canister for purging fuel vapor from the vapor collection canister during a purge operation. A variable speed fuel pump is disposed within the fuel storage tank for delivering fuel to a fuel delivery line. The fuel management system further includes a controller provided in a module disposed in fluid communication with the fuel. The controller controls the amount of fuel pumped with the variable speed fuel pump to deliver fuel to the fuel delivery line, and further controls the purge and vent actuators to perform the purge and vent operations.

According to another aspect of the present invention, a fuel delivery system is provided for delivering fuel from a storage tank to a fuel rail of an engine in a vehicle. The fuel delivery system includes a variable speed fuel pump for pumping fuel from a storage tank to a fuel delivery line coupled to a fuel rail. The fuel pump has a variable speed electric motor operable at multiple speeds. The fuel delivery system also includes a sensor for monitoring a load demand characteristic of the vehicle. The fuel delivery system further includes a controller for controlling the speed of the electric motor as a function of the monitored characteristic. The controller commands a first motor speed during a sensed high load demand characteristic and further commands a second lower motor speed during sensed low load demand characteristic.

According to a further aspect of the present invention, a fuel delivery system for delivering fuel from a storage tank to a fuel delivery line for an engine in a vehicle is provided. The fuel delivery system includes a variable speed fuel pump for pumping fuel from a storage tank to a fuel delivery line. The fuel pump includes a variable speed electric motor operable at variable speeds. The fuel delivery system further includes a return line in fluid communication with the fluid delivery line, and a flow sensor for sensing the flow rate of fuel through the return line. A controller controls the speed of the electric motor as a function of the sensed flow rate.

According to yet a further aspect of the present invention, a fuel fill system and method are provided for controlling the fuel filling of a fuel storage tank. The fuel fill system includes a vapor collection canister coupled to the fuel storage tank for collecting evaporated fuel vapor. A vent actuator is coupled to the fuel storage tank for venting gas from the fuel storage tank during a vent operation. A purge actuator is coupled to the vapor collection canister for purging fuel vapor from the vapor collection canister during a purge operation. A controller controls the vent actuator and purge actuator, and further controls the vent actuator during a fuel fill operation to control the dispensing of fuel into the fuel storage tank.

Yet, a further aspect of the present invention includes a method of venting gas from within a fuel storage tank of a vehicle comprising the steps of sensing an internal pressure within the fuel storage tank, and controlling a vent actuator as a function of the sensed internal pressure. Another aspect of the present invention includes a method of sensing a vehicle accident and turning off fuel delivery when a vehicle accident is sensed.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
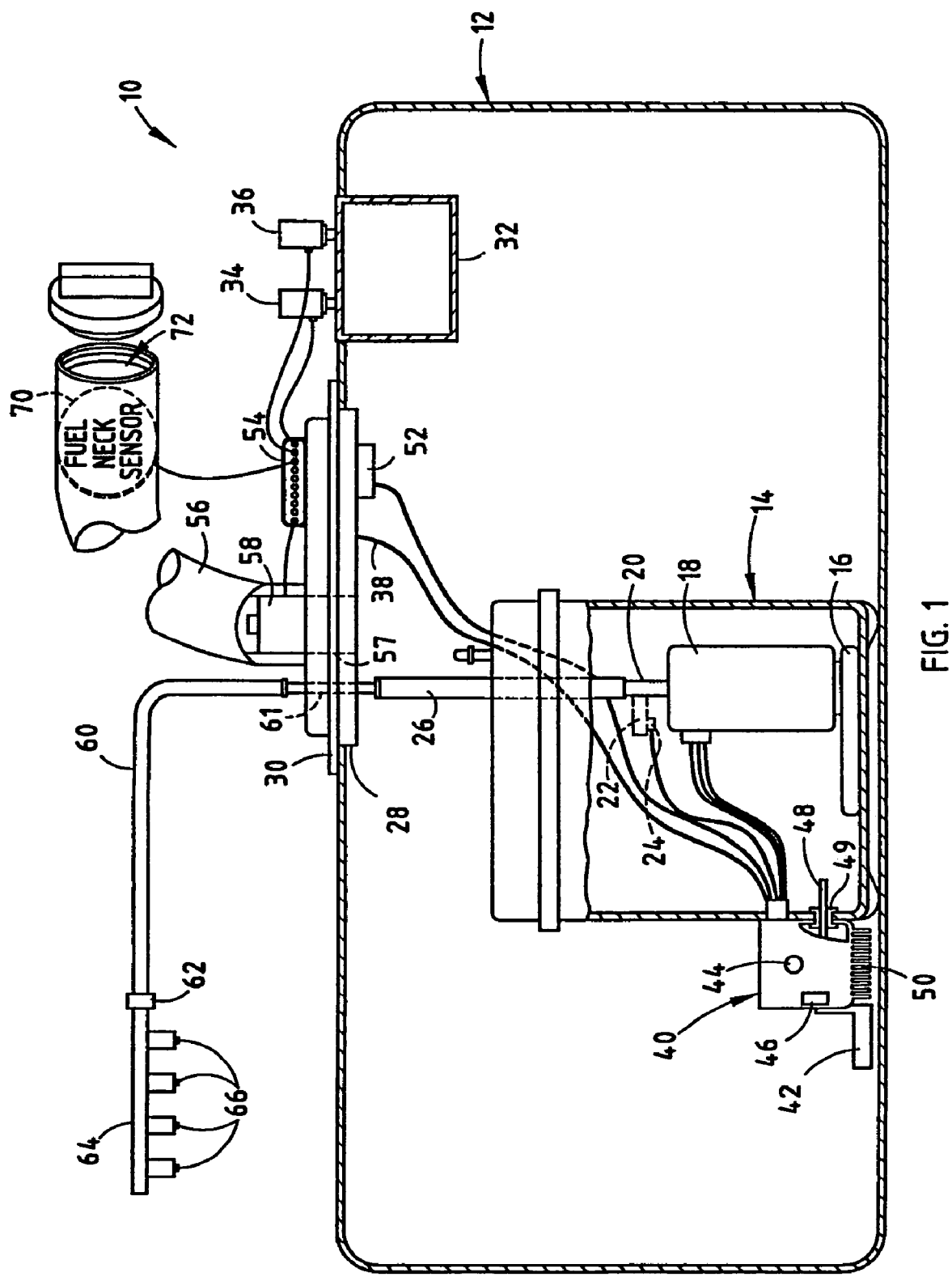
FIG. 1 is a schematic diagram shown in partial cross-sectional view illustrating a vehicle fuel management system according to a first embodiment of the present invention.

Referring to FIG. 1, a first embodiment of the vehicle fuel management system 10 is generally illustrated for use in on-board management and control of fuel for an engine in an automotive vehicle. The vehicle fuel management system 10 integrates various fuel related functions generally associated with the fill, storage, and delivery of fuel to the engine in an automotive vehicle. The vehicle fuel management system 10 includes a fuel delivery system for delivering fuel from a fuel storage tank 12 to a fuel rail 64 associated with the vehicle engine. The vehicle fuel management system 10 also controls the fuel fill operation to fill and store fuel in the fuel storage tank 12. Further, the fuel management system 10 controls the fuel vapor vent and purge operations to vent pressurized gas and purge evaporated vapor emissions from a fuel collection canister, respectively. The various fuel related functions performed by the fuel management system 10 are integrated together and are adapted to be controlled locally to provide for a cost affordable, adaptive, and efficient fuel management system.

The fuel storage tank 12 defines a contained volume for storing fuel (e.g., gasoline) that is made available for delivery to the vehicle engine. Disposed within the fuel storage tank 12 is a fuel reservoir assembly 14 which contains a fuel filter 16 and a fuel pump 18. The fuel reservoir assembly 14 is located at or near the bottom wall of tank 12 so that it is substantially submerged in the fuel when a sufficient supply of fuel is present. The fuel reservoir assembly 14 is arranged so that fuel passes via inlets into the reservoir assembly 14 from the surrounding fuel storage tank 12. The fuel pump 18 has a pump outlet 20 which, in turn, is connected to a fuel delivery line 26. Also shown is a fuel return line 22 located on pump outlet 20. A non-contact fuel pressure sensor 24 is coupled to the fuel return line 22 for measuring fuel pressure in the return line 22. The fuel pump 18 draws a controlled amount of fuel from the fuel reservoir assembly 14 through the fuel filter 16 to produce pressurized fuel in the pump outlet 20 and, thus, in the fuel delivery line 26 to control module 40 is connected to fuel pump 18. In combination, this creates the variable speed control.

According to the first embodiment, a fuel control module (FCM) 40 is mounted to the outside of fuel reservoir assembly 14 so that the module 40 is substantially positioned at or near the bottom wall of tank 12 and, thus, module 40 is likewise submerged in the stored fuel. Fuel control module 40 contains various electronic devices commonly housed within and/or connected to a housing having cooling fins 50 which serve to cool the fuel control module 40 and its associated electronics via thermal conduction with the fuel contained within the fuel storage tank 12. The cooling fins 50 are thermally conductive (e.g., aluminum) and are disposed in a heat transfer relationship with the module 40 electronics and the surrounding fuel to transfer thermal energy away from the module 40 and its electronics.

The fuel control module 40 is shown containing a non-contact fuel level sensor 42 for measuring the fuel level within the fuel storage tank 12. Fuel level sensor 42 may include a piezo sensor. An inertia switch 46 is also provided in fuel control module 40 for sensing inertia due to dynamic movement. Inertia switch 46 may include an acceleration sensor for detecting acceleration indicative of a vehicle collision. The inertia switch 46 serves as a local sensing mechanism to detect a vehicle collision so that corrective action may be taken to control fuel storage and delivery during the detected collision. For example, the fuel pump 18 may be shut off upon the inertia switch 46 detecting a vehicle collision or other vehicle accident. The fuel control module 40 further includes a fuel temperature sensor 44 for measuring temperature of the fuel within the fuel storage tank 12. Extending through a seal 49 in the fuel reservoir assembly 14 is a fuel composition sensor 48 for sensing the composition of the fuel to be delivered to the engine. The sensed fuel composition may include sensing the presence of additives such as alcohol and ethanol to provide flex fuel sensing. By determining the sensed composition of the fuel, the fuel control module 40 notifies the engine control module of changes in the fuel composition that may require altering of engine operating parameters to enhance the operation of the engine. The fuel control module 40 further includes a microprocessor-based controller in communication with the various sensors and control devices for controlling various aspects of the fuel management system 10, as explained herein.

Mounted to the inside top wall of fuel storage tank 12 is a carbon vapor collection canister 32 for collecting fuel vapor within the fuel storage tank 12. Fuel vapor collection canister 32 may include a carbon (e.g., charcoal) material as is commonly known in the art for collecting evaporative emissions fuel vapors to allow for venting of the fuel storage tank 12. The fuel vapor collection canister 32 is shown connected to a fuel vapor vent actuator 34 and a fuel vapor purge actuator 36. The fuel vapor vent actuator 34 is an electromechanical valve which allows for venting to occur between the outside atmosphere and the inside volume of the fuel storage tank 12. When relieving pressure from within fuel storage tank 12, the vented gases are passed through the vapor collection canister 32 so that the evaporated gas vapors are collected and thus are not discharged into the surrounding atmosphere. The fuel vapor purge actuator 36 is an electromechanical valve that controls the purge operation to purge collected fuel vapor from within the vapor collection canister 32. During a fuel vapor purge operation, the collected fuel vapor trapped within the canister 32 is purged and sent to the vehicle engine, where the purged fuel vapor is burned to dispose of the fuel vapor with reduced emissions. The fuel vapor purge actuator 36 and fuel vapor vent actuator 34 are locally controlled by the fuel control module 40 in accordance with the present invention. The fuel vapor vent actuator 34 is controllable to control the pressure within the fuel storage tank 12, which allows for control of the fuel fill operation. The need for a purge operation is monitored by the fuel control module 40, and a purge operation can be requested by the fuel control module 40 based on the need for a purge operation.

Formed within the top wall of fuel storage tank 12 is an opening 28 which is sealed closed with a cap assembly 30. Prior to installing the cap assembly 30, the fuel reservoir assembly 14, with fuel delivery control 40 attached thereto, is inserted into the fuel storage tank 14. By providing a single opening in the fuel storage tank 12, various components of the fuel delivery system may be easily installed within the fuel storage tank 12 through a single opening formed within the fuel storage tank 12 to accommodate the fuel fill inlet, fuel delivery outlet, and electrical wire connections between the inside and outside of the fuel storage tank 12. The cap assembly 30 includes a fuel flow outlet 61 in fluid communication with the fuel delivery line 26 for delivering fuel from the fuel delivery line 26 to a chassis fuel line 60. The chassis fuel line 60 is connected to the fuel rail 64 generally located at the engine of the vehicle. The fuel rail 64 includes a plurality of fuel injectors 66 for injecting fuel into the corresponding cylinders of the internal combustion engine (not shown). A pressure sensor 62 is located at the inlet of the fuel rail 64 to measure pressure of fuel supplied to the fuel rail 64.

The cap assembly 30 also includes a fuel fill inlet 57 in fluid communication with the fuel storage tank 12 and the fuel fill tube 56 which leads to a fuel fill inlet 72 generally located on the outside of the vehicle. The fuel fill inlet 72 is configured to receive a fuel fill dispensing nozzle (not shown) at a refueling station to allow fuel to be dispensed within the fuel storage tank 12. A fuel neck sensor 70 is provided near the fuel fill inlet 72 to sense the presence of a fuel fill dispensing nozzle so as to detect an anticipated fuel fill operation. Disposed within the fuel fill tube 56 is a electromechanical valve 58 for opening and closing the fuel flow passage through the fuel fill tube 56. The electromechanical valve 58 is an electrically controlled, normally closed valve that prevents fuel flow through fuel fill tube 56. Electromechanical valve 58 is controlled in response to a control command signal received from the fuel control module 40. Upon sensing insertion of a fuel fill dispensing nozzle into the fuel fill inlet 72 of fuel fill tube 56 via fuel neck sensor 70, fuel control module 40 commands electromechanical valve 58 to open to allow fuel to be dispensed through fuel fill tube 56 and inlet 57 into the fuel storage tank 12. When the fuel fill dispensing nozzle is removed from the fuel fill inlet 72, as detected by fuel neck sensor 70, fuel control module 40 commands the valve 58 to close to prevent fluid flow through fuel fill tube 56. Additionally, the electromechanical valve 58 also serves to prevent leakage of fuel from the fuel storage tank 12 through the fuel fill tube 56, particularly during a vehicle rollover event, a vehicle collision, or other vehicle accidents. By providing an electrically controlled valve 58, the flow of fuel through the fuel fill tube 56 can thus be controlled.

Mounted to the cap assembly 30 is an electrical connector 54 generally having a plurality of electrical pin connectors. Electrical connector 54 includes a signal line that connects to a communication bus (not shown) which allows data communication with other devices within the vehicle, including the engine control module. The communication bus may include any of a number of known vehicle communication buses. Alternately, the communication bus may include one or more dedicated communication lines for communicating with one or more devices located elsewhere in the vehicle. The electrical connector 54 is also connected to a plurality of signal lines, generally shown by line 38, which extend into the fuel storage tank 12 and connect to the fuel control module 40. Outside of fuel storage tank 12, electrical connector 54 is connected to the electromechanical valve 58, pressure sensor 62, and fuel neck sensor 70. Electrical connector 54 is further connected to the fuel vapor purge actuator 36 and vent actuator 34 for controlling actuation of the corresponding purge and vent devices, as is explained later hereinafter. Vent actuator 34 and purge actuator 36 may communicate with fuel control module 40 either directly within the fuel tank 12 or by way of connector 54 (as shown).

Figure 2:
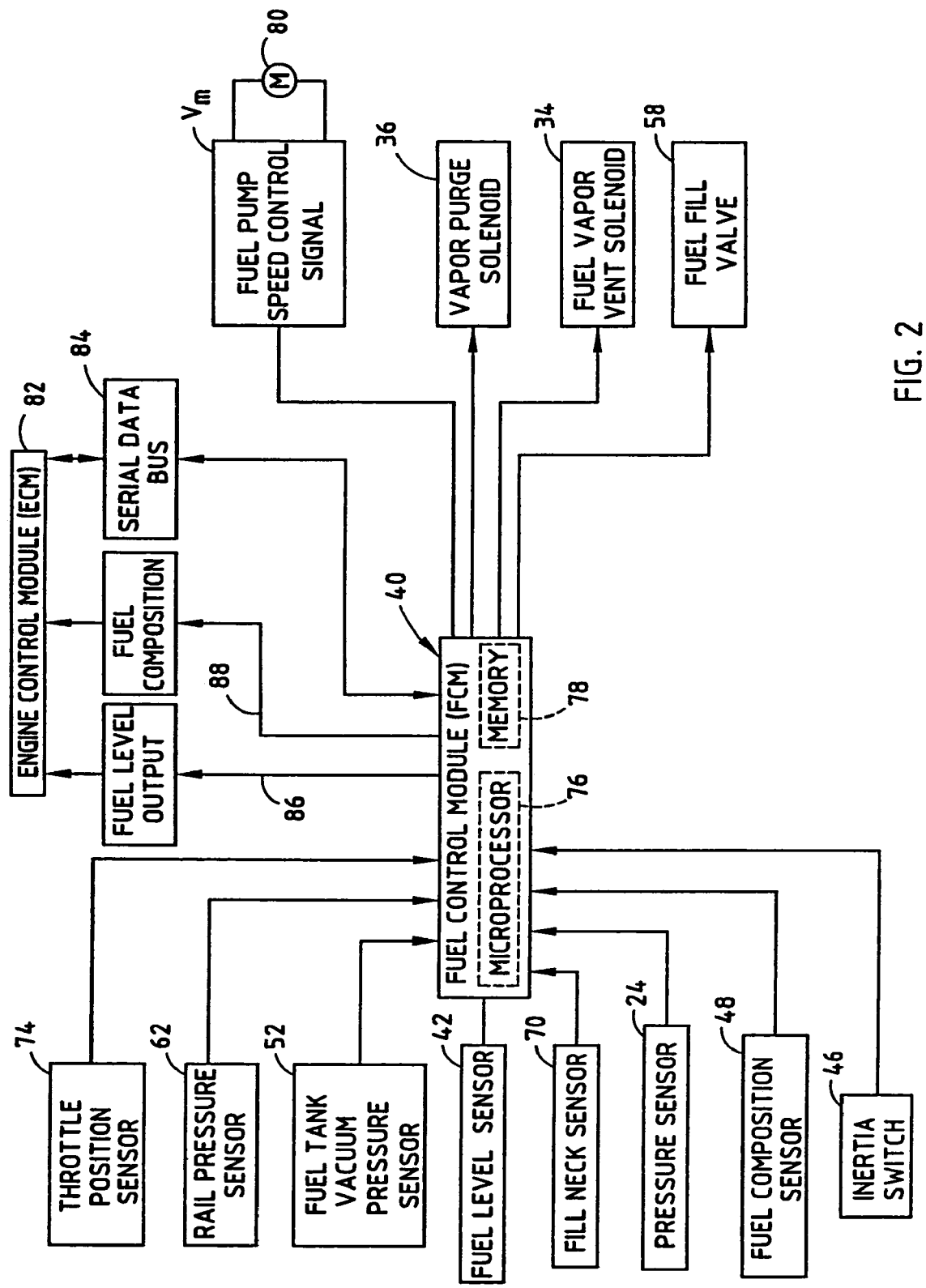
FIG. 2 is a block diagram further illustrating the vehicle fuel management system of FIG. 1.

The fuel control module 40 is shown in FIG. 2 in communication with various devices of the fuel management system 10. The fuel control module 40 includes a microprocessor-based controller having a microprocessor 76 and memory 78. The controller hardware including the microprocessor 76 may include a commercially available controller having sufficient processing capability to process the programmed routines. Fuel management control routines are stored in memory 78 and are processed by the microprocessor 76 to perform fuel storage and delivery functions as described herein. The fuel control module 40 receives an input from the throttle position sensor 74 which provides an indication of the demand for engine load and changes to engine load. By monitoring the engine throttle position, an anticipated change in fuel demand can be determined so that the amount of fuel delivered to the fuel rail 64 is timely controlled. Fuel control module 40 also receives signals from the fuel rail pressure sensor 62, the fuel tank vacuum pressure sensor 52, the fuel level sensor 42, the fill neck sensor 70, the pressure sensor 24, inertial switch 46, and fuel composition sensor 48. The fuel control module 40 generates output signals including a fuel pump speed control voltage signal ($V_m$) for controlling the speed of a variable speed electric motor 80 driving the fuel pump 18. In addition, the fuel control module 40 generates output signals to control the fuel vapor vent solenoid (actuator) 34 and the fuel purge solenoid (actuator) 36. The fuel control module 40 further provides an output control signal to control actuation of the fuel fill tube mounted electromechanical valve 58.

The fuel control module 40 is an adaptive local controller that provides local control of the fuel management system 10. Fuel control module 40 also communicates with the engine control module (ECM) 82 via a serial data communication bus 84. Fuel control module 40 communicates serial data containing information including control command signals, shared sensor signals, and diagnostic information with the engine control module 82. In addition, the fuel control module 40 may further communicate with the engine control module 82 via one or more dedicated signal lines, such as lines 86 and 88 shown communicating the fuel level output and the fuel composition signals, respectively. It should be appreciated that a shared data communication bus and/or any number of dedicated signal lines may be connected between the fuel control module 40 and the engine control module 82 to communicate data therebetween.

Figure 3:
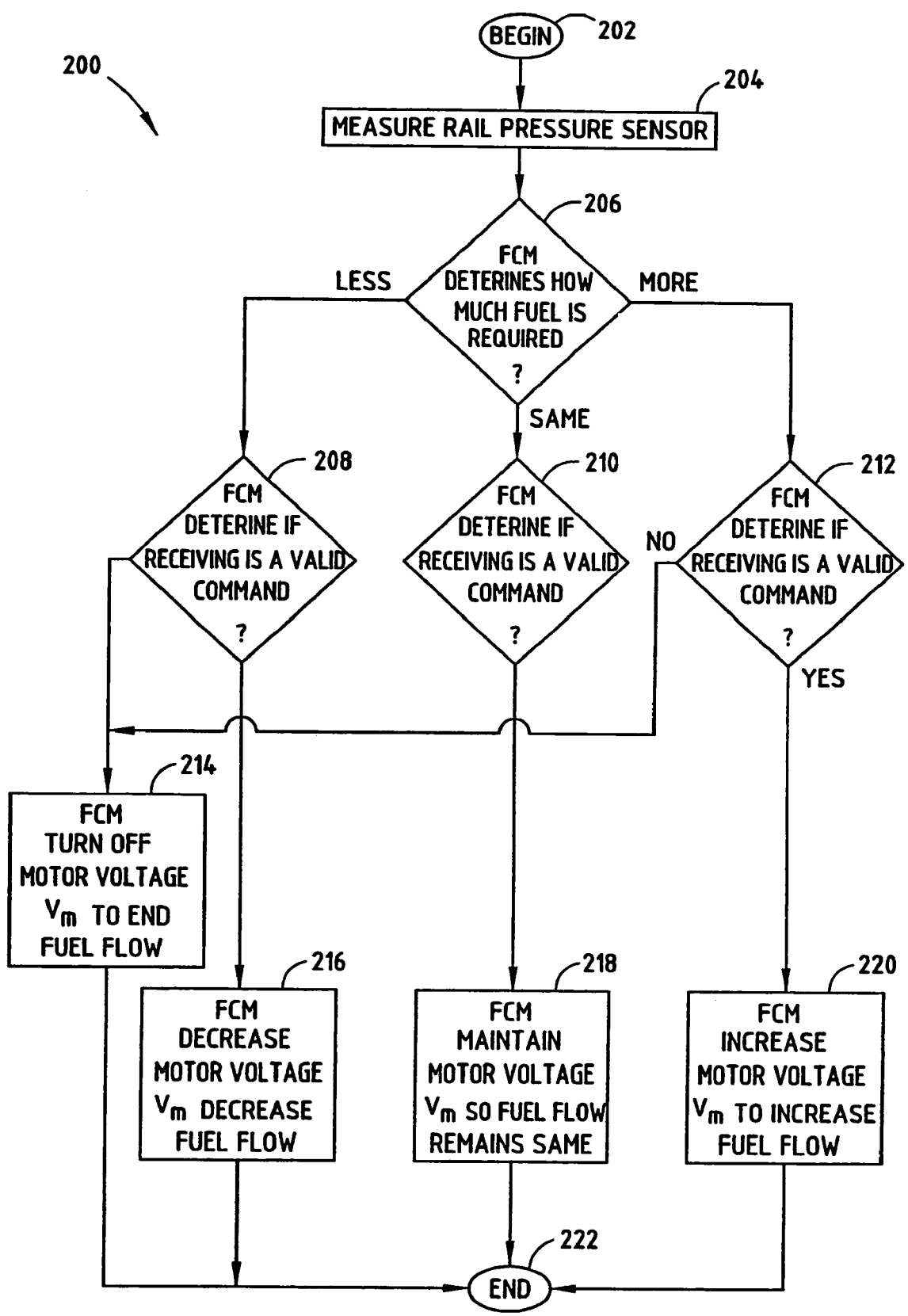
FIG. 3 is a flow diagram illustrating a control routine for controlling fuel delivery based on sensed pressure with the fuel management system.

Referring to FIG. 3, one embodiment of a control routine 200 performed by fuel control module 40 for controlling the fuel delivery system of the fuel management system 10 according to the first embodiment of FIGS. 1 and 2 is illustrated therein. The fuel delivery control routine 200 begins at step 202 and proceeds to step 204 to measure the fuel rail pressure via the rail pressure sensor 62. The pressure sensor 62 provides an indication of the fuel pressure supplied to the fuel rail 64. The fuel delivery control routine 200, via the fuel control module 40, monitors the fuel rail pressure and controls the speed of the variable speed fuel pump 18 so as to maintain a predetermined fuel pressure at the fuel rail 64. In decision step 206, the fuel control module 40 determines how much fuel is required to maintain the predetermined fuel pressure at the fuel rail. If less fuel is required to maintain the predetermined rail pressure, fuel delivery control routine 200 proceeds to decision step 208 to check if the fuel control module 40 has determined the receipt of a valid command and, if so, the fuel control module 40 decreases the pump motor control voltage $V_m$ to decrease the fuel flow in step 216, and then completes the routine 200 in step 222. If the fuel control module 40 determines that more fuel is required to maintain the predetermined rail pressure, control routine 200 proceeds to decision step 212 to check if the fuel control module 40 has determined receipt of a valid command and, if so, the fuel control module 40 increases the pump motor control voltage $V_m$ to increase fuel flow, and then completes the routine 200 at step 222. If the fuel control module 40 determines that the fuel requirements have not changed in order to maintain the predetermined rail pressure, fuel delivery control routine 200 proceeds to decision step 210 to check if the fuel control module 40 has determined receipt of a valid command and, if so, the fuel control module 40 commands the same (unchanged) pump motor control voltage $V_m$ so that the fuel flow remains the same, before ending control routine 200 at step 222. If the fuel control module 40 determines that the received command is not valid in any of steps 208, 210, or 212, control routine 20Q proceeds to step 214 so that the fuel control module 40 turns off the pump motor control voltage $V_m$ to stop the fuel flow, and then control routine 200 ends at step 222.

Accordingly, the fuel control module 40 monitors the fuel rail pressure and determines the amount of fuel required to maintain a predetermined rail pressure. If the fuel rail pressure decreases, the fuel control module 40 requests an increase in the pump motor control voltage $V_m$ to increase the speed of the fuel pump. Contrarily, if the fuel rail pressure increases, the fuel control module 40 decreases the pump motor control voltage $V_m$ to decrease fuel flow to the fuel rail 64 to maintain the predetermined rail pressure. It should be appreciated that the change in the pump motor control voltage $V_m$ may be achieved with a small predetermined increment, or may be varied in different increments, in order to accurately meet the fuel rail pressure requirements to maintain the predetermined fuel rail pressure. The fuel delivery control routine 200 is repeated fast enough such that small incremental changes in the motor voltage $V_m$ may add up to large changes in a very short period of time (e.g., 15 ms). It should be appreciated that the fuel control module 40 monitors the fuel rail pressure and provides the variable speed fuel pump control to maintain the predetermined rail pressure, substantially independent of the engine control module 82. As a consequence, the fuel delivery may be controlled locally at the fuel control module 40, thereby relaxing the processing requirements of the engine control module 82.

Figure 4:
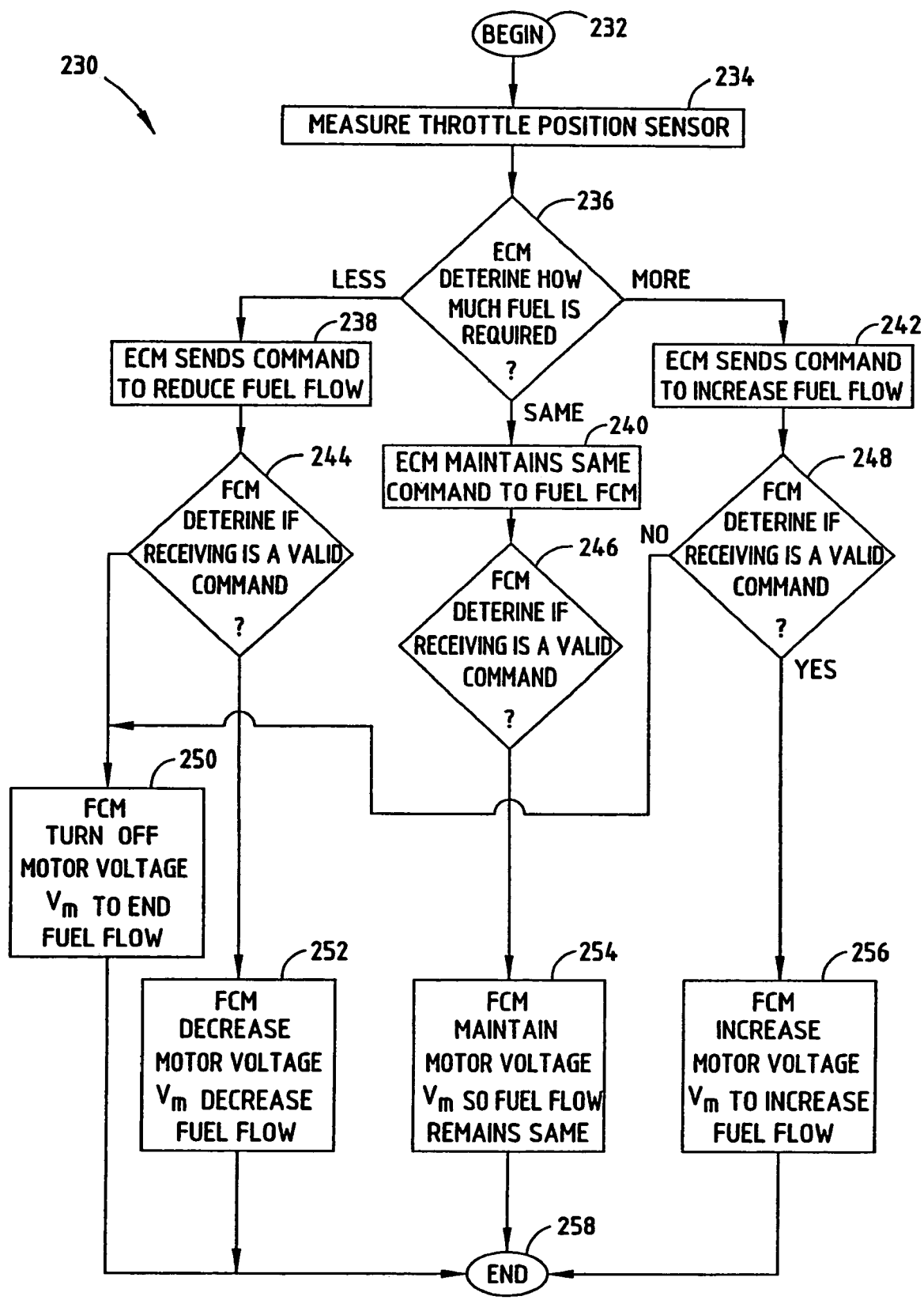
FIG. 4 is a flow diagram illustrating a control routine for controlling fuel delivery based on sensed engine throttle position with the fuel management system.

Another embodiment of a fuel delivery control routine 230 is shown in FIG. 4 for controlling the fuel pump 18 based on the sensed engine throttle position. The fuel delivery control routine 230 begins at step 232 and proceeds to step 234 to measure the engine throttle position as sensed by the throttle position sensor 74. The engine throttle position provides an indication of the anticipated load demanded by the engine, and thus the anticipated fuel injection requirements. In decision step 236, the engine control module (ECM) 82 determines how much fuel is required to meet the engine requirements for the measured throttle position. If the throttle position changes, the engine control module 82 can anticipate the increase or decrease in the amount of fuel that is required to supply sufficient fuel to the fuel rail 64. If the engine control module 82 determines that less fuel is required, the engine control module 82 sends a command signal to the fuel control module 40 to reduce the fuel flow in step 238. Thereafter, in step 244, the fuel control module 40 determines if a valid command is received and, if so, decreases the pump motor control voltage $V_m$ to decrease fuel flow. If the engine control module 82 determines that more fuel is required based on the measured throttle position, the engine control module 82 sends a command signal to the fuel control module 40 to increase the fuel flow in step 242. Thereafter, the fuel control module 40 determines if a valid command is received and, if so, increases the pump motor control voltage $V_m$ to increase fuel flow in step 256. If the engine control module 82 determines that the same fuel is required, the engine control module 82 maintains the same fuel control command to the fuel control module 40. Thereafter, the fuel control module 40 determines if a valid command is received and, if so, maintains the same pump motor control voltage $V_m$ so that the fuel flow remains the same. If the fuel control module 40 determines that a valid command has not been received in any of steps 244, 246, or 248, the fuel control module 40 turns off the pump motor control voltage $V_m$ to end fuel flow in step 250, before ending the control routine 230 in step 258.

Accordingly, the fuel delivery control routine 230 monitors throttle position of the engine and anticipates the fuel demand of the engine so that fuel delivery can be adjusted to meet the anticipated demand. In particular, the engine control module 82 instructs the fuel control module 40 to vary the speed of the fuel pump 18 to increase or decrease the amount of fuel delivered to the fuel rail 64 as a function of the change in the monitored throttle position. By adjusting the fuel pressure at the fuel rail 64 based on throttle position, the fuel delivery control routine 230 is able to quickly adapt to anticipated engine load changes, thus minimizing any fuel delivery delay which may otherwise occur.

Figure 5:
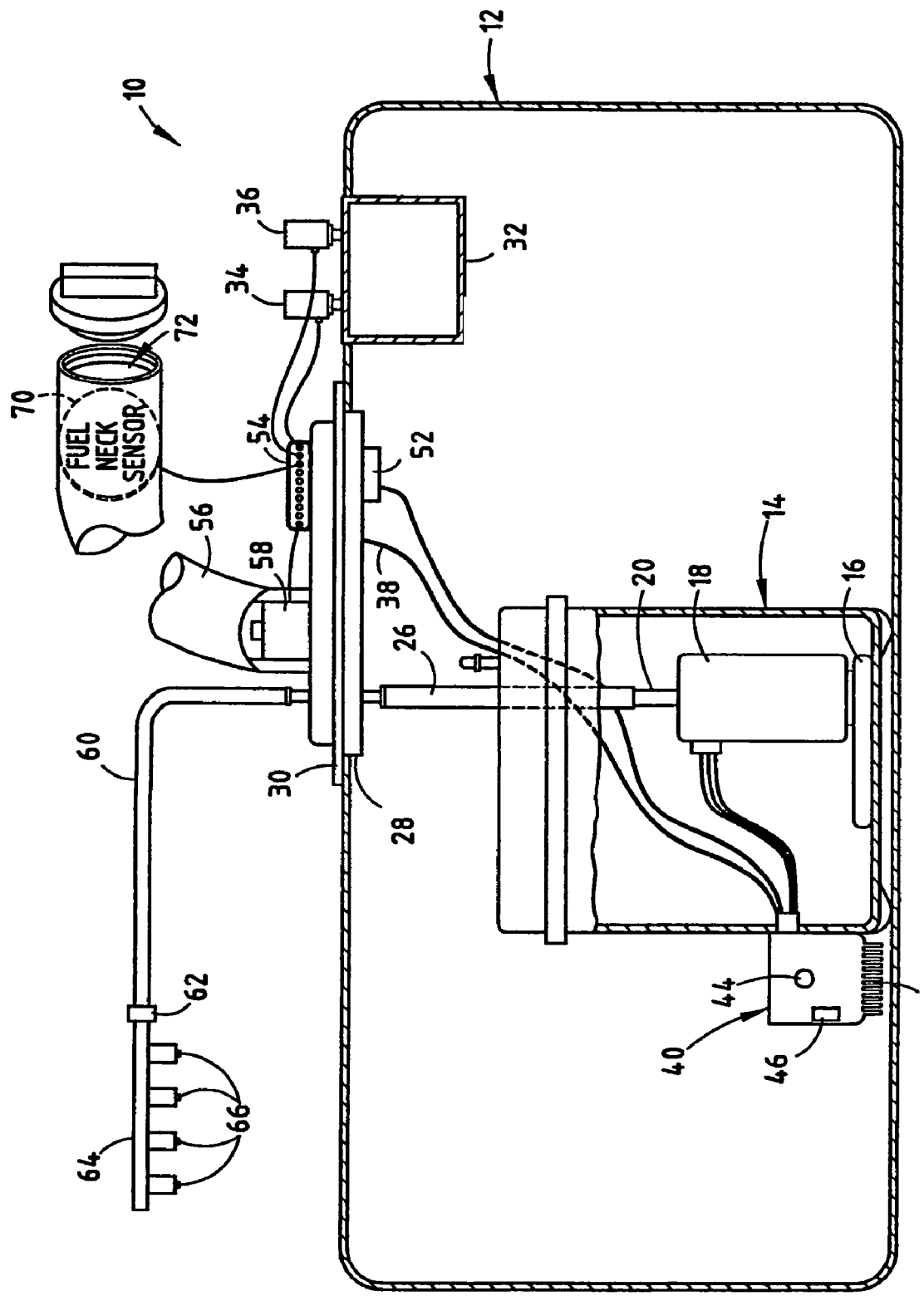
FIG. 5 is a schematic diagram illustrating a vehicle fuel management system according to a second embodiment.
Figure 6:
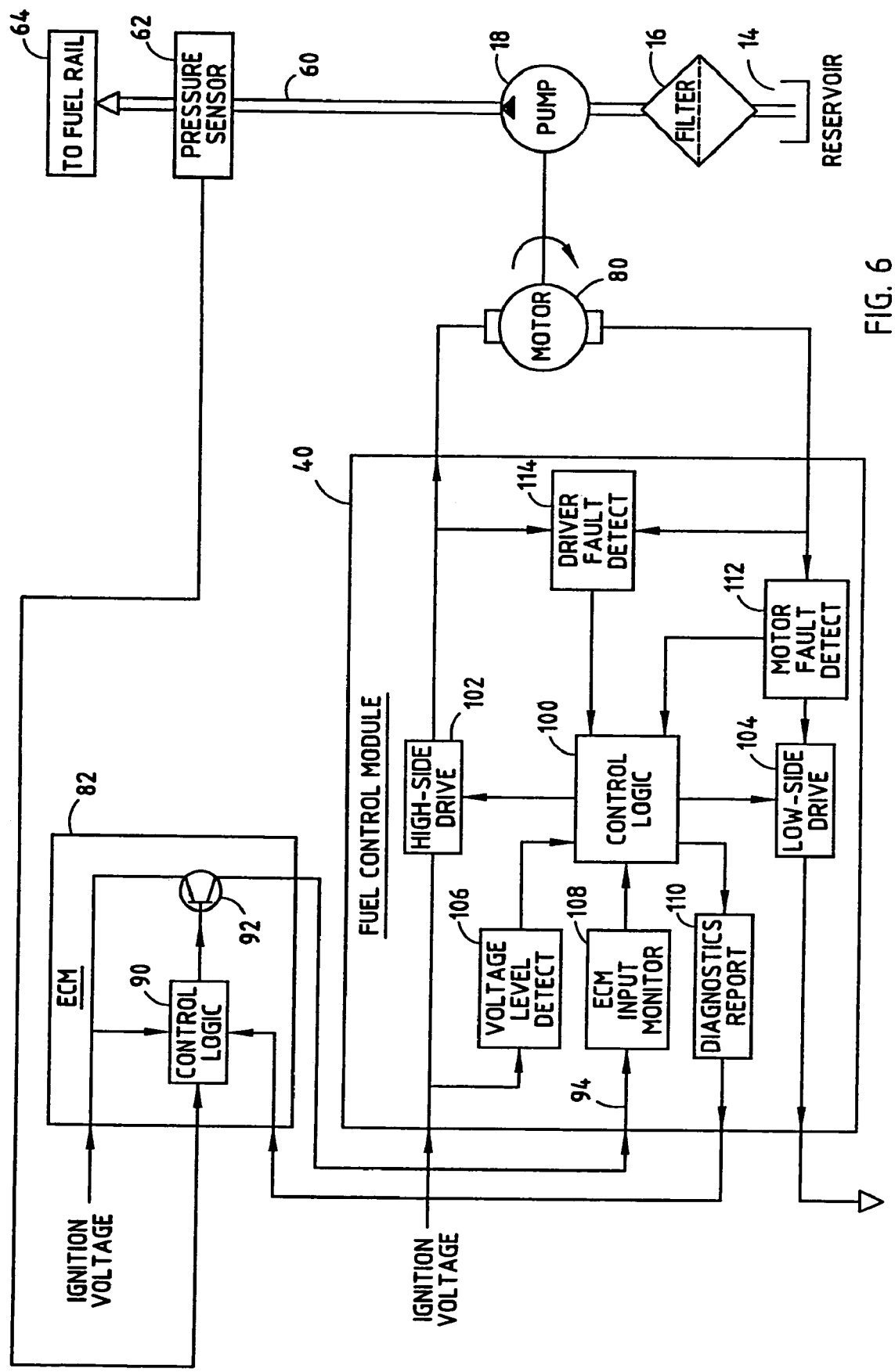
FIG. 6 is a block/flow diagram illustrating fuel delivery of the fuel management system according to the embodiment of FIG. 5.

A second embodiment of the fuel management system 10 is illustrated in FIGS. 5 and 6 with the fuel control module 40 mounted to the fuel reservoir assembly 14, absent the return path 22 and pressure sensor 24 shown in the first embodiment. The fuel management system 10 of the second embodiment has no return path for returning fuel back into the fuel reservoir assembly 14, and thus is a returnless fuel delivery system. Instead, the fuel that is pumped into the pump outlet 20 is passed through both fuel delivery line 26 and chassis line 60 and is supplied to the fuel rail 64.

As shown in FIG. 6, the fuel rail pressure sensed at the fuel rail 64 via pressure sensor 62 is provided as an input to the engine control module 82. The engine control module 82 generates a pulse-width modulated (PWM) output command signal via control logic 90 and transistor 92 that is communicated as a command signal to the fuel control module 40. The engine control module 82 has a microprocessor and memory containing the control logic 90 which is generally configured to execute control routines for controlling functions related to the vehicle engine. For example, the engine control module 82 controls the injection of fuel and air into the engine cylinders via the fuel injectors 66. In addition, the engine control module 82 may process the sensed fuel rail pressure and generate a pulse-width modulated (PWM) control output signal to instruct the fuel control module 40 to control the speed of the fuel pump 18. Alternately, the fuel rail pressure may be directly input into the fuel control module 40 or may be communicated to the fuel control module 40 via the engine control module 82 so that the fuel control module 40 generates the motor control signal to control the speed of the fuel pump 18.

The fuel control module 40 includes control logic 100 containing control routines for controlling various functions of the fuel management system 10. The control logic 100 receives the pulse-width modulated signal via an engine control module input monitor 108 on line 94. Control logic 100 converts the pulse-width modulated command control signal to a DC output voltage $V_m$. According to one example, the fuel control module 40 converts the pulse-width modulated command signal to a voltage $V_m$ in the range of 4.5 volts to 12.8 volts.

The fuel control module 40 also receives the vehicle ignition voltage (e.g., +14 volts) via a high-side drive 102, while a low-side drive 104 is coupled between ground and the low side of the motor 80. Pump motor control voltage $V_m$ is applied to the high-side drive 102, while the low-side drive 104 is grounded. By employing both high-side and low-side drives 102 and 104, the fuel control module 40 is able to electrically isolate and disconnect each of the high and low sides of the pump motor 80 for safety and protection in the event that an electrical failure occurs. A motor fault detect block 112 detects faults of the motor 80, a driver fault detect block 114 detects faults of the motor drive, and a diagnostics report 110 is generated by the fuel control module 40 and is communicated to the engine control module 82. The fuel control module 40 is able to provide diagnostic monitoring of the variable speed fuel pump and the local devices, and to communicate the monitored information in the diagnostics report 110 to the engine control module 82. This enables localized diagnostic testing to occur, such as checking for leakage within the fuel storage tank 12. By providing local diagnostics testing, fuel management processing requirements of the engine control module 82 are thus reduced, thereby leaving processing capability of engine control module 82 available for other operations in the vehicle.

In operation, the engine control module 82 monitors the fuel rail pressure at the fuel rail 64 and adjusts the pulse-width modulated input signal to provide closed loop monitoring of the fuel system pressure. With the ignition voltage applied to the fuel control module 40 and the engine control module 82 providing a pulse-width modulated command signal indicative of fuel flow requirements of the system, the fuel control module 40 generates and supplies the motor control voltage $V_m$ to the fuel pump motor 80 to command a desired speed of the motor 80. The spinning action of the fuel pump draws fuel from the fuel reservoir 14 through the fuel filter 16 at the required flow rate and pressure. In this embodiment, no mechanical pressure regulator is used to control the fuel pressure at the pump outlet. Instead, the closed loop monitoring by the engine control module 82 of pressure at the fuel rail 64 is used to command the fuel control module 40 to adjust the speed of the fuel pump motor 80 to compensate for changes in fuel pressure that may occur. The output drive of the fuel control module 40 is linear and therefore produces low electromagnetic interference (EMI) noise as compared to a pulse-width modulated motor drive arrangement. While a DC voltage drive has been described herein, it should be appreciated that alternative drivers, such as pulse-width modulated drive signals, may be employed to control the speed of the pump motor 80.

Figure 7:
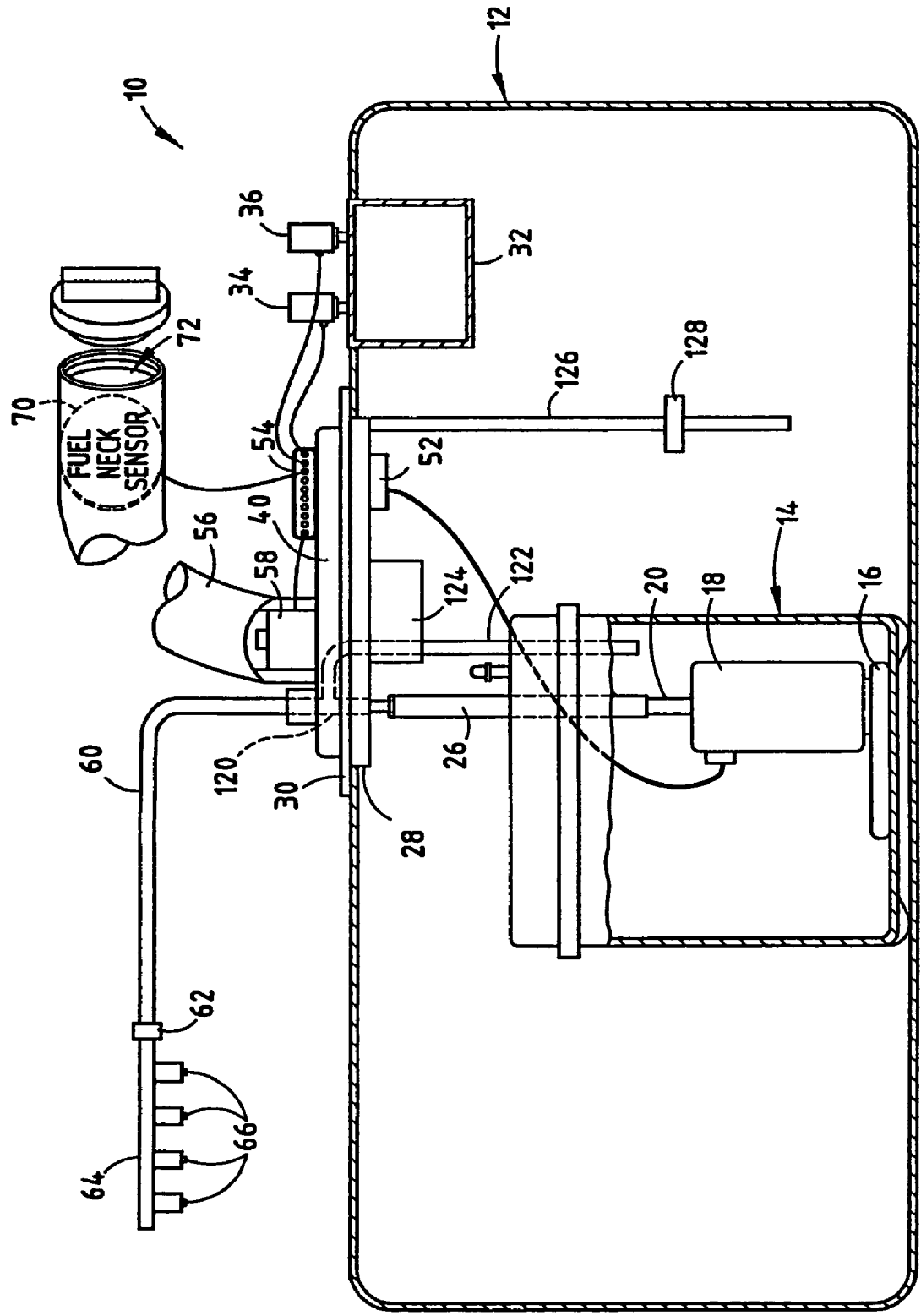
FIG. 7 is a schematic diagram illustrating a vehicle fuel management system according to a third embodiment.

Referring to FIG. 7, the fuel management system 10 is shown according to a third embodiment of the present invention. In the third embodiment, the fuel control module 40 is integrated within the cap assembly 30 outside of the fuel storage tank 12, and a pressure regulator 120 is integrally formed in the cap assembly 30. The pressure regulator 120 has an inlet connected to the variable speed pump 18 for receiving the pumped fuel in line 26. The pressure regulator 120 regulates the amount of pressurized fuel applied to the fuel rail 60 via the fuel delivery line 60. Pressure regulator 120 has a fuel return line 122 which returns regulated fuel supplied by fuel pump 18 that is not passed on to chassis fuel line 60. The fuel return line 122 integrally extends within the housing of fuel control module 40 and extends within cap assembly 30 and into fuel reservoir assembly 14. With the fuel return line 122 extending through fuel control module 40, the returned fuel is in heat transfer relationship with fuel control module 40 to serve as a cooling medium to cool the fuel control module 40 and its associated electronics. Accordingly, the fuel control module 40 may be mounted outside of the fuel storage tank 12 and may likewise be cooled by the fuel to prevent overheating of the electronics and thus allow for a reduced package size fuel control module 40.

It should be appreciated that the pressure regulator 120 regulates the amount of fuel pressure supplied to the fuel chassis line 60 and fuel rail 64, despite the difference in fuel pressure generated by the variable speed fuel pump 18, which is varied in speed to meet the demands of the engine. The return line 122 further extends through a flow sensor 124 for monitoring the flow rate of returned fuel in line 122. The flow sensor 124 may be separate from or integrally formed within the fuel control module 40. By sensing return flow rate of fuel through line 122, the fuel pump 18 may be varied based on the sensed flow rate. Alternately, it should be appreciated that the fuel pump 18 may be controlled based on other parameters as described herein including the rail pressure as sensed by pressure sensor 62, and the engine throttle position.

Figure 8:
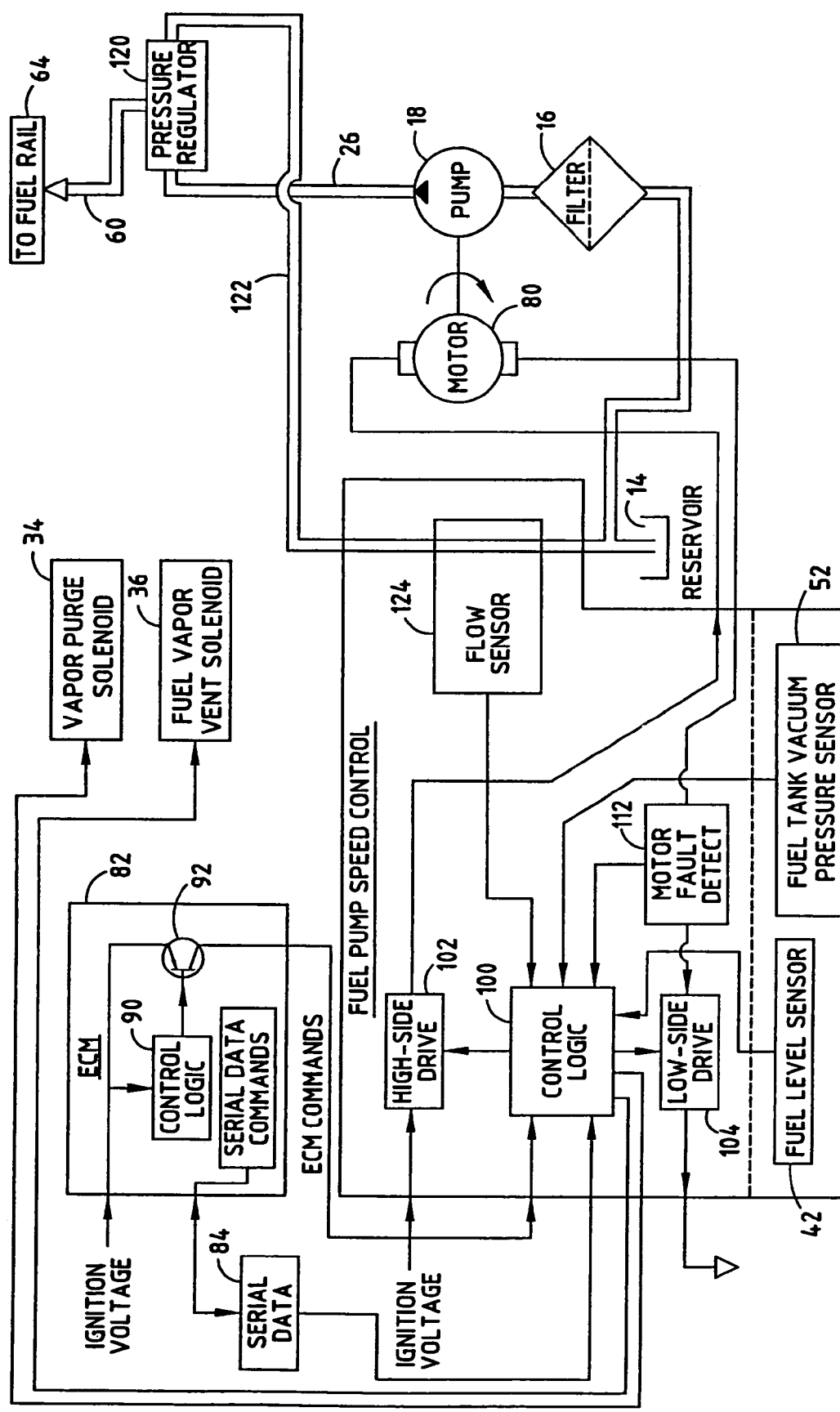
FIG. 8 is a block/flow diagram illustrating fuel delivery of the fuel management system according to the embodiment of FIG. 7.

The fuel delivery system shown in FIG. 7 is further illustrated in FIG. 8. As shown, the fuel return line 122 of pressure regulator 120 returns fuel to the fuel reservoir assembly 14. The fuel return line 122 has a known constant cross-sectional area. Fluid flowing through the fuel return line 122 is monitored by the flow sensor 124 which senses the flow rate of the fluid through return line 122. By maintaining a constant flow rate through return line 122, a constant fuel pressure can be achieved at the fuel rail 64. Fuel control module 40 receives the measured flow signal and generates a motor control signal $V_m$ to control the speed of the variable speed pump motor 80 to maintain a desired fuel flow rate through fuel return line 122.

The fuel control module 40 includes a high-side drive 102 for receiving the ignition voltage and a low-side drive 104 coupled to ground. Motor fault detect block 112 provides fault detection to the control logic 100. The fuel control module 40 may share serial data with the engine control module 82 via serial data bus 84. The serial data may include parameters related to the engine and other devices within the vehicle. In addition, diagnostic ports may be sent from the fuel control module 40 to the engine control module 82 via the serial data bus 84. The fuel control module 40 receives command signals from the engine control module 82 which are used in emergency situations such as vehicle rollover, crank timeout, and vehicle collision to command the fuel control module 40 to shut down the fuel pump 18.

During normal operation, the fuel control module 40 monitors the fuel flow rate through return line 122 as sensed by flow sensor 124 and controls the speed of the fuel pump motor 80 to provide accurate fuel delivery to the fuel rail 60. With the ignition voltage applied, the fuel control module 40 provides a linear output signal to the fuel pump motor 80 based on monitored fuel flow rate which causes the motor 80 and pump 18 to spin and pump fuel to the pressure regulator 120. The use of a high-side drive 102 and a low-side drive 104 allows the fuel control module 40 to electrically isolate or disconnect each side of the pump motor 80, which offers safety and protection in the event of an electrical failure. While high-side and low-side drives 102 and 104 are shown, it should be appreciated that one of the high-side or low-side drives 102 and 104 alone may be employed. The spinning action of the fuel pump 18 draws fuel from the reservoir 14 through the fuel filter 16, at a pressure corresponding to the fuel flow rate. When changes in fuel flow rate occur, the fuel control module 40 senses such changes and compensates by adjusting the linear output voltage $V_m$ to the motor 80 to maintain the system flow rate. If fuel pressure is higher than the required system pressure, the pressure regulator 120 causes the fuel to be bypassed through the fuel return line 122 to the reservoir 14. The output drive of the fuel control module 40 is linear and therefore produces low electromagnetic interference (EMI) noise. It should be appreciated that alternative drivers, such as a peak pulse-width modulated driver, may be employed to control the speed of the pump motor 80.

Figure 9:
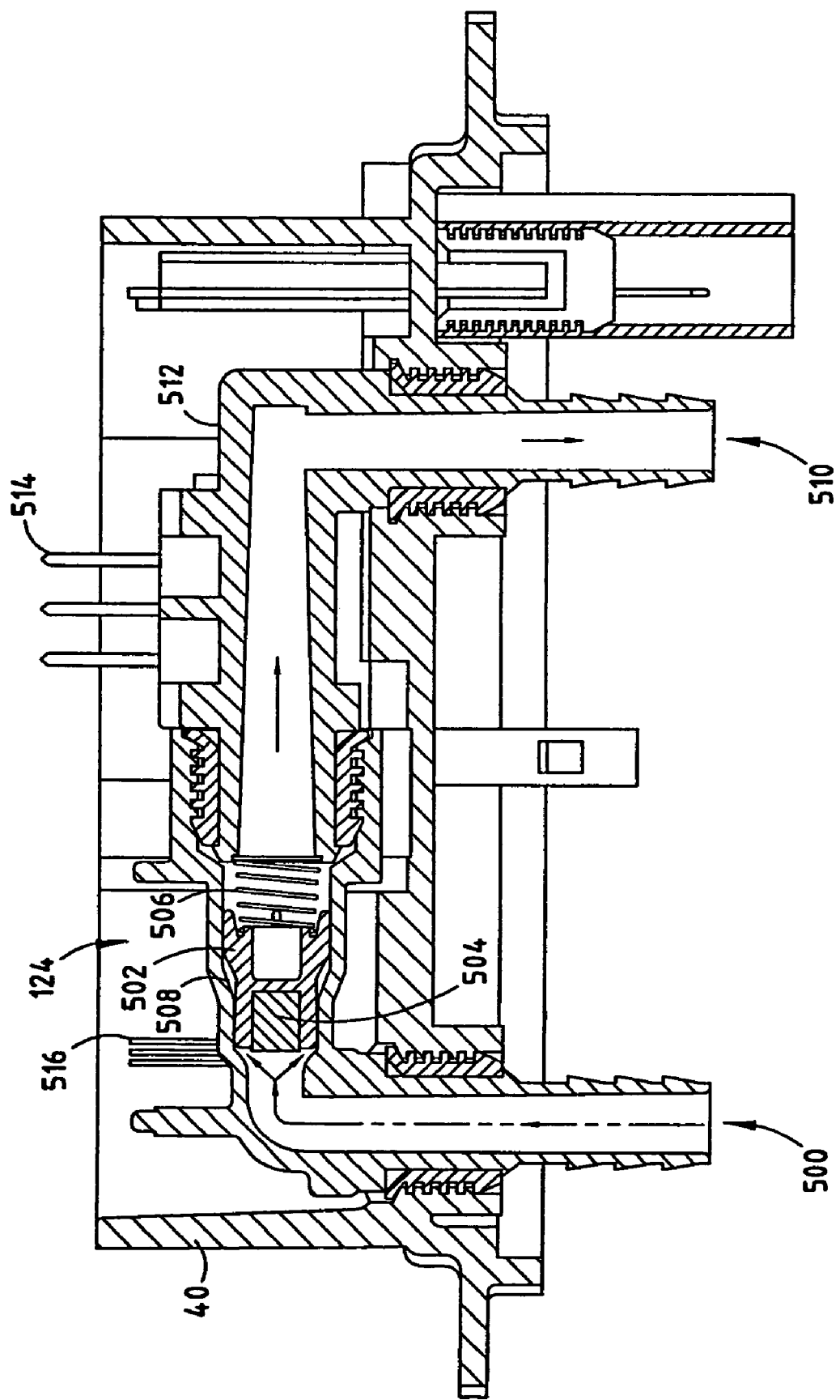
FIG. 9 is a cross-sectional view of one embodiment of a flow sensor employed in the fuel management system of FIG. 7.

Referring to FIG. 9, the flow sensor 124 is shown configured according to a first embodiment. The flow sensor 24 is a Hall-effect sensor employing a moveable valve assembly 502 having a magnet 504 and a spring 506 biasing the valve assembly 502 in one direction. The valve assembly 502 is disposed in a fluid path defined by housing 508 between an inlet 500 and an output 510 which completes the flow path that returns fuel to the fuel storage tank via outlet 510. A sensing element 516 senses the displacement of the magnet 504 within valve assembly 502 which moves within housing 508 as a function of the fuel flow. The flow sensor 124 is shown integrally formed and sealed within cap assembly 40. Additionally, the flow sensor 124 includes a power device 514 (e.g., MOSFET) and is formed of an aluminum housing 512 that is thermally conductive to provide heat transfer relationship between the fuel flow in the return path and the electronic devices, such as power device 514, to remove heat from the electronic devices. As engine fuel demand changes, the integrated fuel delivery system optimizes fuel flow. The fuel flow may be continuously adjusted to deliver the lowest optimal fuel flow and the lowest system power. As engine fuel consumption increases, the bypass flow decreases and the valve assembly 502 begins to move. The electronic control detects the sensed movement of the valve assembly 502 and increases motor power to return the valve assembly 502 to a designated bypass flow set point. As engine fuel consumption decreases, increased bypass flow is sensed, and the electronic control decreases motor power to return the valve assembly 502 to the designated bypass flow set point. It should be appreciated that the fuel flow is bypassed internally to prevent high pressure from occurring at the inlet of the sensor assembly.

The flow sensor 24 can be integrated electrically with the fuel delivery system motor control and other sensor and control electronics to provide a complete vehicle fuel management control system for the regulation of fuel delivery to the engine. In the first embodiment shown, when no fuel flow is present in the flow sensor 124, the inlet side of the flow sensor valve assembly 502 is forced against the sensor housing 508 by spring 506. As fuel flow increases in the inlet, the valve assembly 502 is forced forward by the force of the fluid flow passing over the valve assembly 502 to complete fuel flow through the outlet 510. The spring 506 biasing of the valve assembly 502 is compressed to maintain a force against the back side of the valve assembly 502 that is equal to the force applied to the front surface, and as the flow increases, the valve assembly 502 is forced back further, thus further compressing the spring 506.

Figure 10:
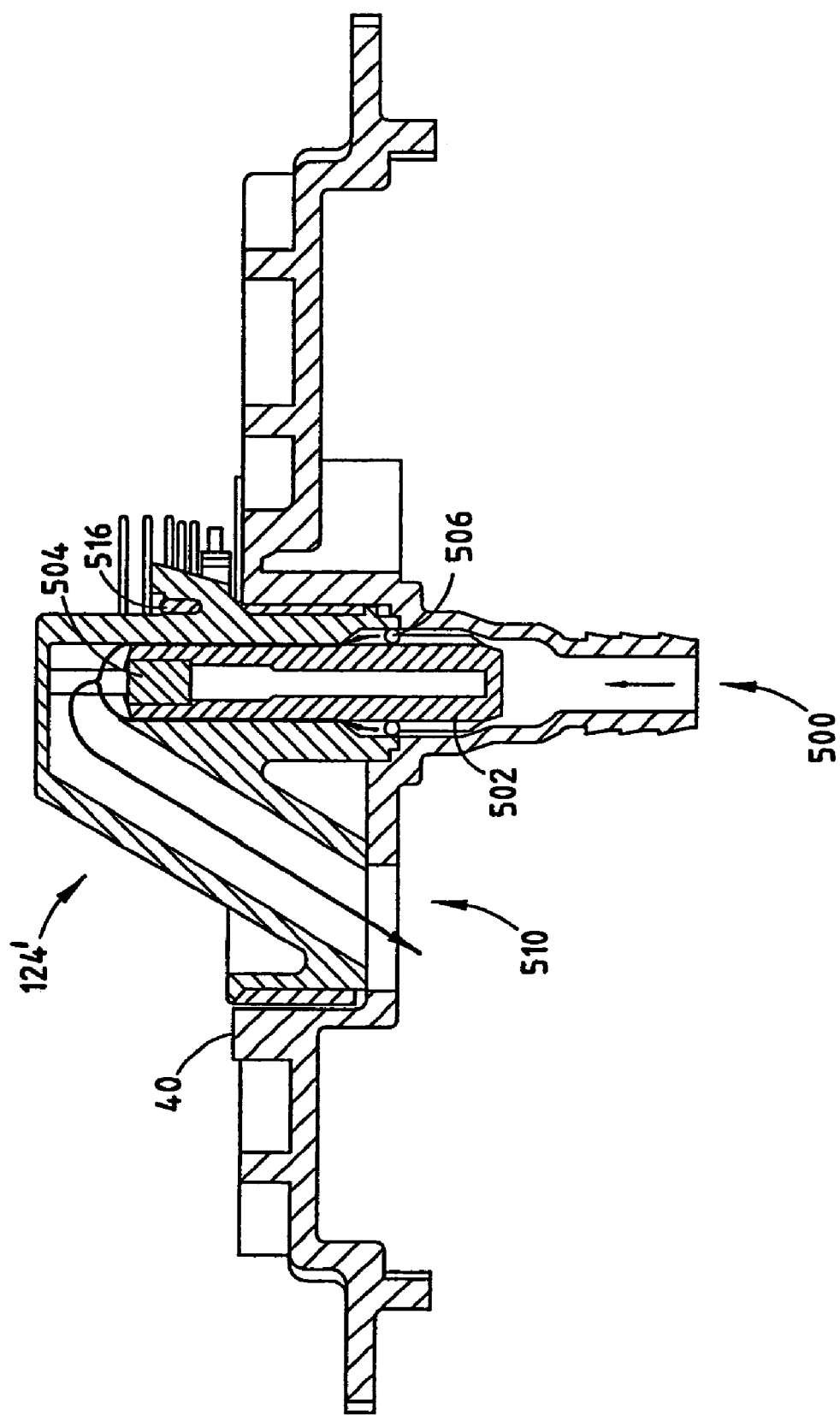
FIG. 10 is a cross-sectional view of another embodiment of a flow sensor employed in the fuel management system of FIG. 7.

Referring to FIG. 10, a flow sensor 124' is shown according to a second embodiment. The flow sensor 124' is shown having a vertically disposed valve assembly 502 which has a mass that experiences a force (weight) downward due to gravity. As the fuel flow increases, the fuel flow forces the valve assembly 502 upwards within the vertical cylinder, thus allowing more fuel to pass through to the outlet 510. In addition, the fuel acts as a lubricant on the sides of the valve assembly 502. Thus, the vertical arrangement of the valve assembly 502 provides a self lubricating embodiment which may also utilize weight of the valve assembly and thus reduces the bias force required by spring 506. It is also possible to eliminate the spring 506, according to this embodiment.

Accordingly, the flow sensor 124 or 124' provides a Hall-effect flow sensor for sensing fuel flow through the return path in a vehicle fuel delivery system for use in controlling the speed of the variable speed fuel pump. The flow sensor 124 or 124' provides an analog or discrete digital output signals indicative of the amount of fuel flow through the return path. It should be realized that the travel distance of the valve assembly 502 may be limited to a small distance of 0.25 inch and the sensor may have a flow rate in the range of zero (0) to one hundred fifty (150) liters per hour, according to one example. The flow sensor 124 or 124' and corresponding electronics are in heat transfer relationship with the fuel so as to utilize the fuel in the fuel tank to cool the active electronics, and thus the fuel is advantageously used as a heat sink.

Figure 11:
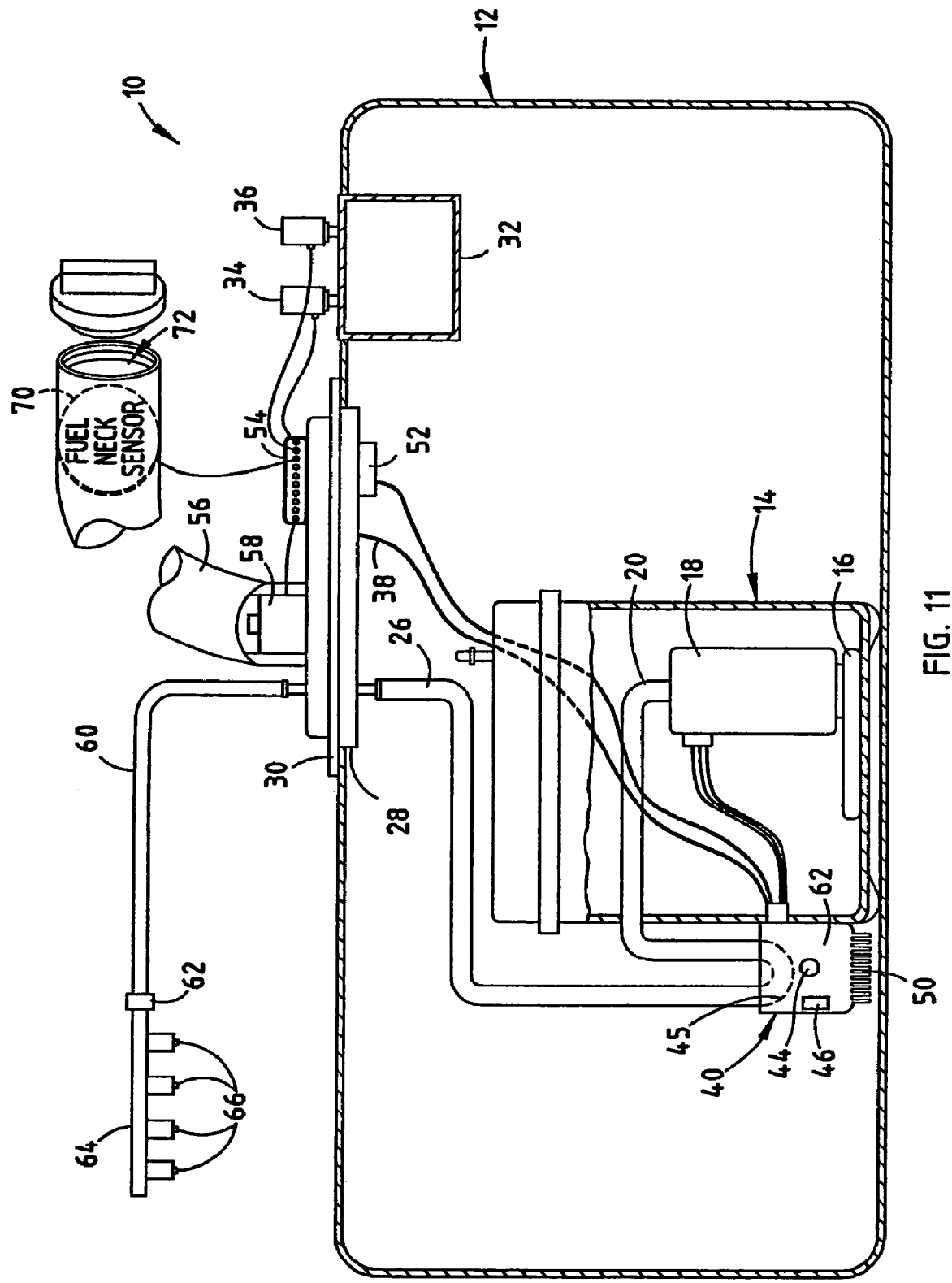
FIG. 11 is a schematic diagram illustrating a vehicle fuel management system according to a fourth embodiment.
Figure 12:
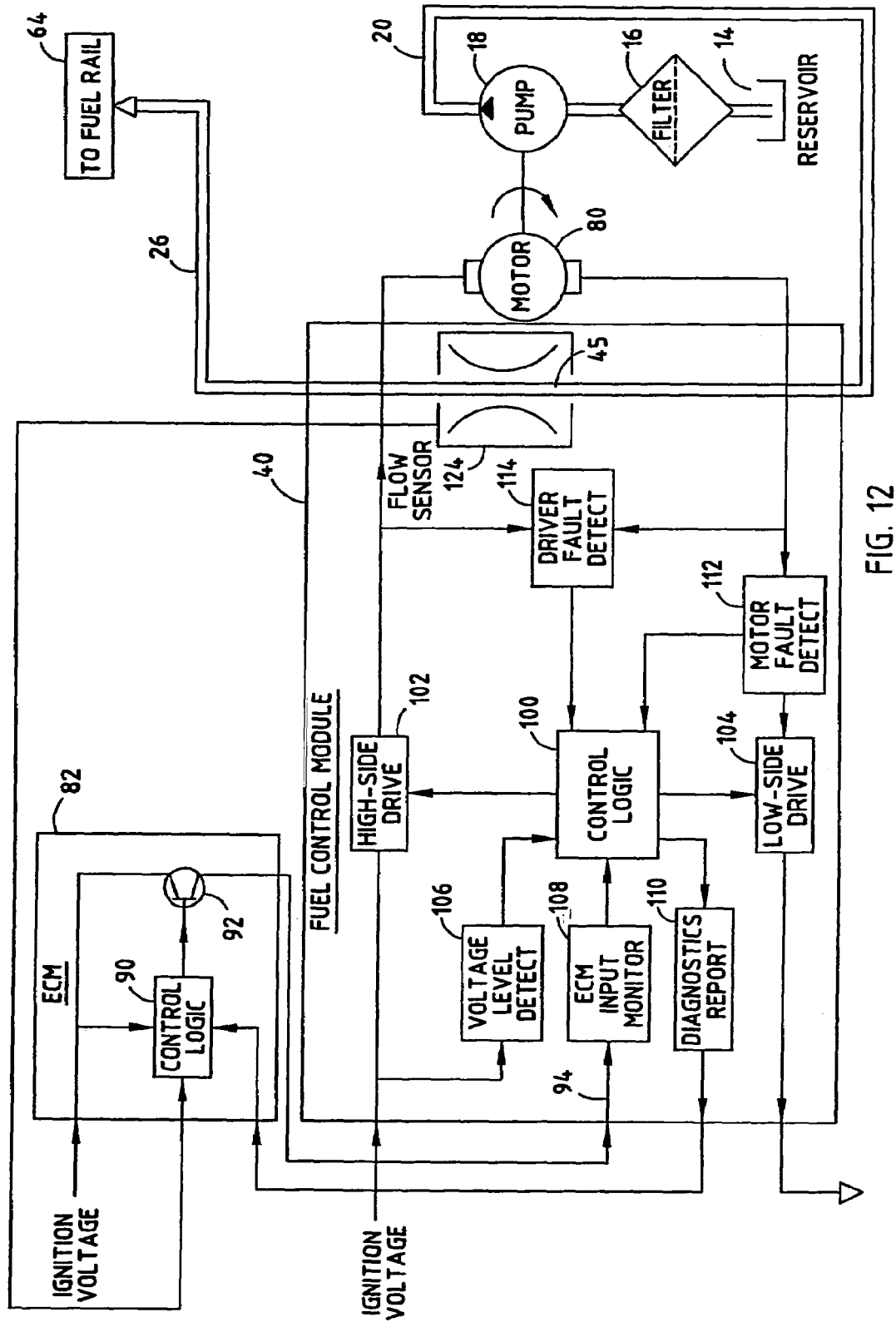
FIG. 12 is a block/flow diagram illustrating fuel delivery of the fuel management system according to the embodiment of FIG. 11.

A fourth embodiment of the fuel management system 10 showing yet a further fuel delivery system is illustrated in FIGS. 11 and 12. In FIG. 11, the fuel management system 10 is shown having the fuel control module 40 disposed within the fuel storage tank 12 and connected to the fuel reservoir assembly 14. In this embodiment, the outlet 20 of the variable speed fuel pump 18 is configured to pass through a flow path 45 provided internal to the fuel control module 14 which, in turn, is connected to the fuel delivery line 26. Disposed in communication with the internal flow path 45 and module 40 is the flow sensor 124 (see FIG. 12) integrally mounted within the fuel control module 40. The flow sensor 124 monitors the rate of flow of fuel through flow passage 45 internal to the fuel control module 40. Accordingly, by employing a flow sensor 124 internal to fuel control module 40, a reduction in the wires and external components is achieved.

Referring particularly to FIG. 12, the fourth embodiment of the fuel management system 10 operates so that the fuel pump 18 pumps fuel through outlet 20 into flow path 45, to fuel delivery line 26, and then to the fuel rail 64. The flow sensor 124 generates an output flow signal that is processed by the fuel control module 40 and is used to control the speed of the variable speed pump motor 80, as explained above.

Figure 13:
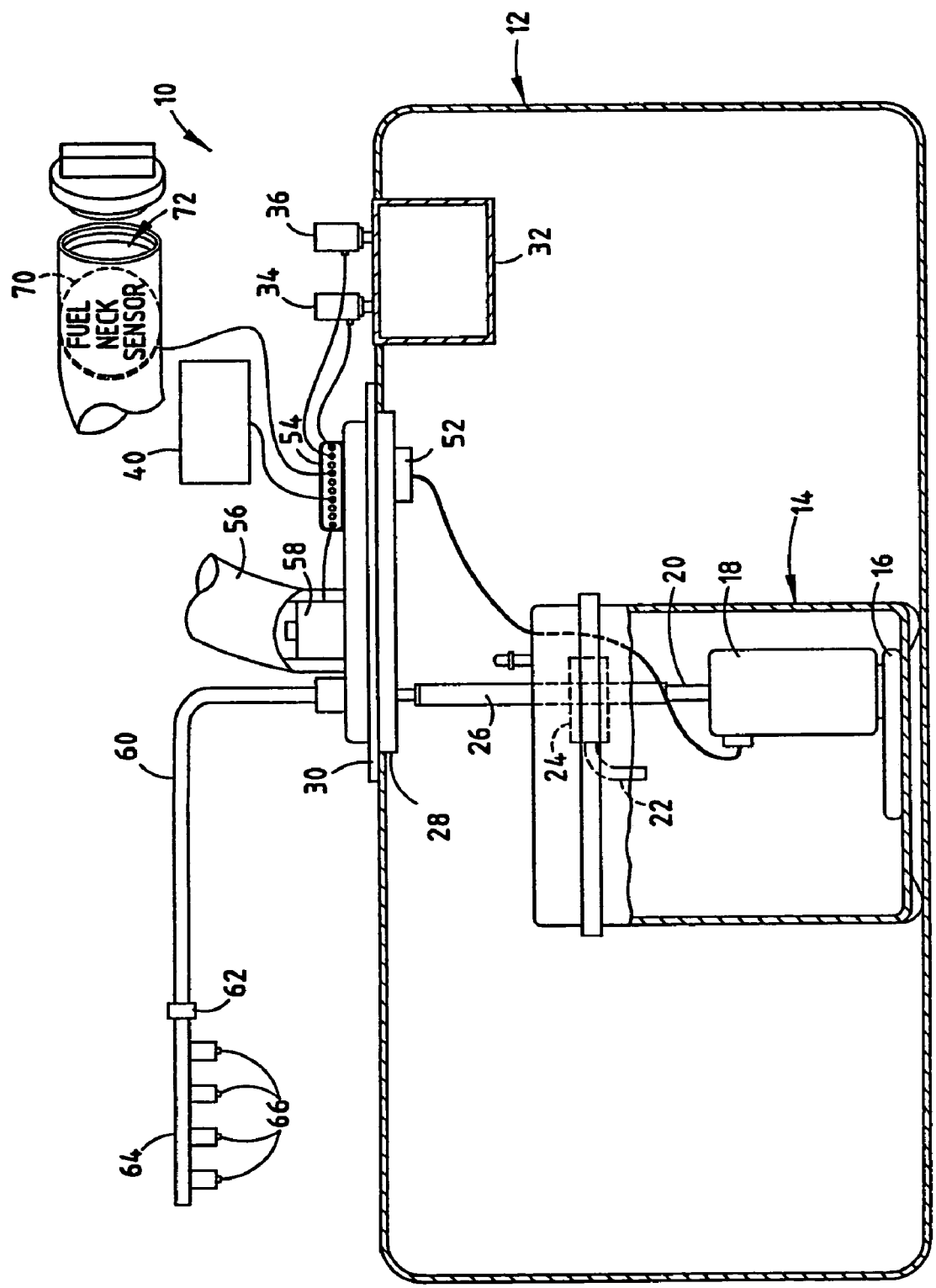
FIG. 13 is a schematic diagram illustrating a vehicle fuel management system according to a fifth embodiment.
Figure 14:
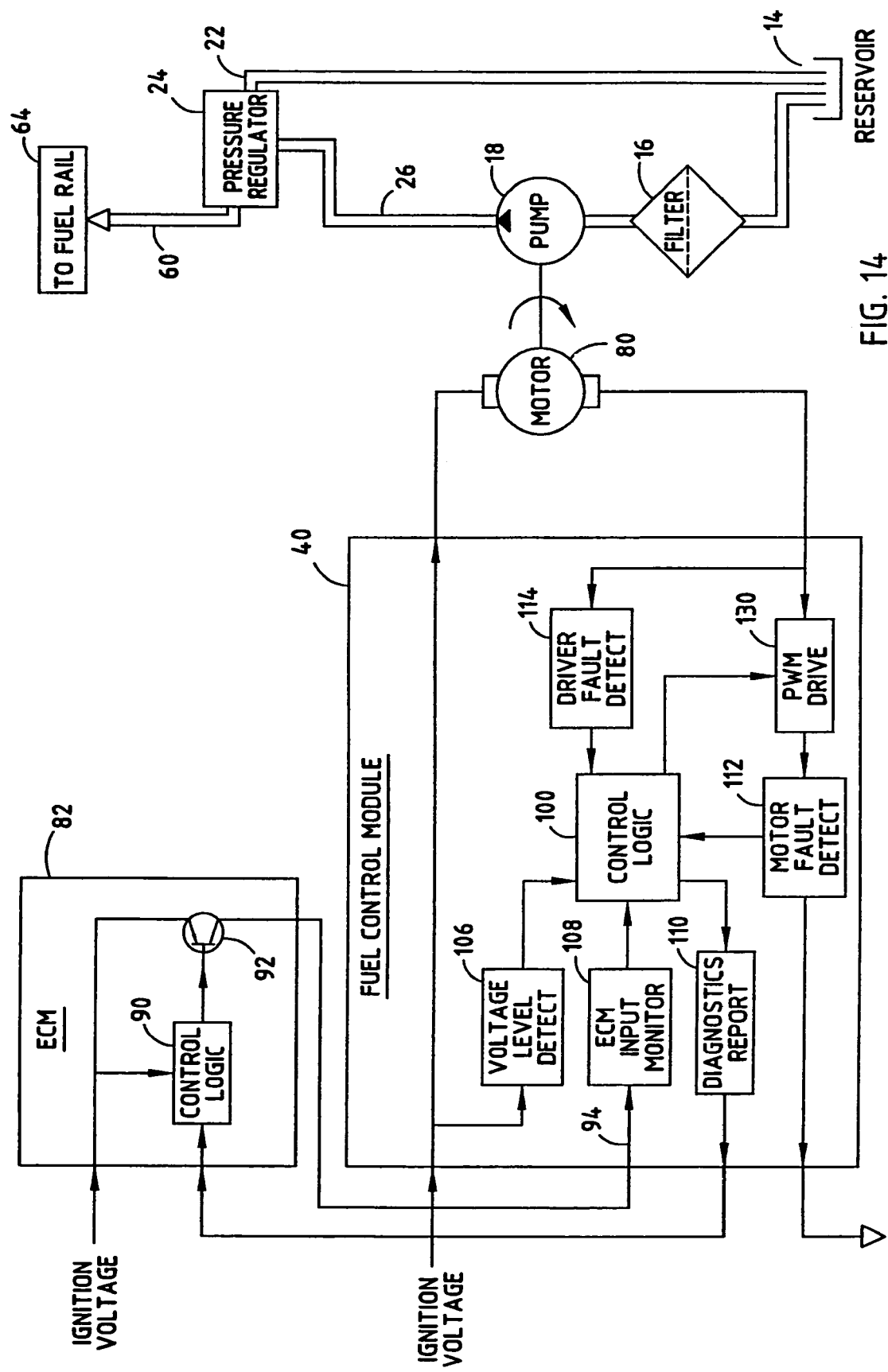
FIG. 14 is a block/flow diagram illustrating fuel delivery of the fuel management system according to the embodiment of FIG. 13.

A fifth embodiment of the fuel management system 10 is illustrated in FIGS. 13 and 14. Referring particularly to FIG. 13, a pressure regulator 24 is disposed within the fuel reservoir assembly 14 connected to the outlet 20 of variable speed fuel pump 18. Pressure regulator 24 regulates the pressure of fuel in line 26 and provides a return fluid flow path 22 to return fuel back into reservoir 14. Also shown is the fuel control module 40 mounted external to the fuel storage tank 12. According to this embodiment, the fuel control module 40 could be located anywhere in the vehicle.

With particular reference to FIG. 14, the pressure regulator 24 is further shown providing the return flow path 22 back to reservoir 14. The variable speed pump motor 80 is driven at a speed commanded by the fuel control module 40 to command the fuel pump 18 to draw fuel through filter 16 to the pressure regulator 24 via pump outlet 20. The pressure regulator 24 regulates the pressure of the fuel supplied to the fuel rail 64 and returns the remaining fuel to the reservoir 14. The fuel control module 40 receives a pulse-width modulated duty cycle command signal from the engine control module 82. The fuel control module 40 calculates the proper motor control signal based on the engine control module 82 input of a pulse-width modulated command duty cycle. The fuel control module 40 also provides to the engine control module 82 diagnostics report 110. In this embodiment, the fuel control module 40 regulates the speed of the fuel pump motor 80 by pulse-width modulating the motor pump output via internal low side drive circuitry 130 causing the pump motor 80 and pump 18 to spin at a desired speed. The spinning action of the pump motor 80 and pump 18 draws fuel from the reservoir 14 through a fuel filter 16, thus producing a fuel pressure just above the required system pressure. The system fuel pressure is maintained using an in-line mechanical pressure regulator 24. If the fuel pressure is higher than the required system pressure, the pressure regulator 24 causes fuel to be bypassed from the system back into the reservoir 14 via return flow line 22. According to this embodiment, the fuel control module 40 controls the speed of the fuel pump motor 80 to provide a controlled amount of fuel flow at a pressure just above what is actually demanded by the vehicle engine. This allows the pressure regulator 24 to maintain fuel pressure while producing minimal bypass flow through flow line 22. According to this configuration, the life of the fuel pump motor 80 may be extended by allowing it to operate at a reduced speed, when less fuel is demanded by the engine. In addition, lower audible noise is generated by the fuel system, particularly at vehicle idle, less heating of the fuel is achieved, and lower power is consumed by the fuel pump motor 80, particularly when the engine fuel demands are low.

Figure 15:
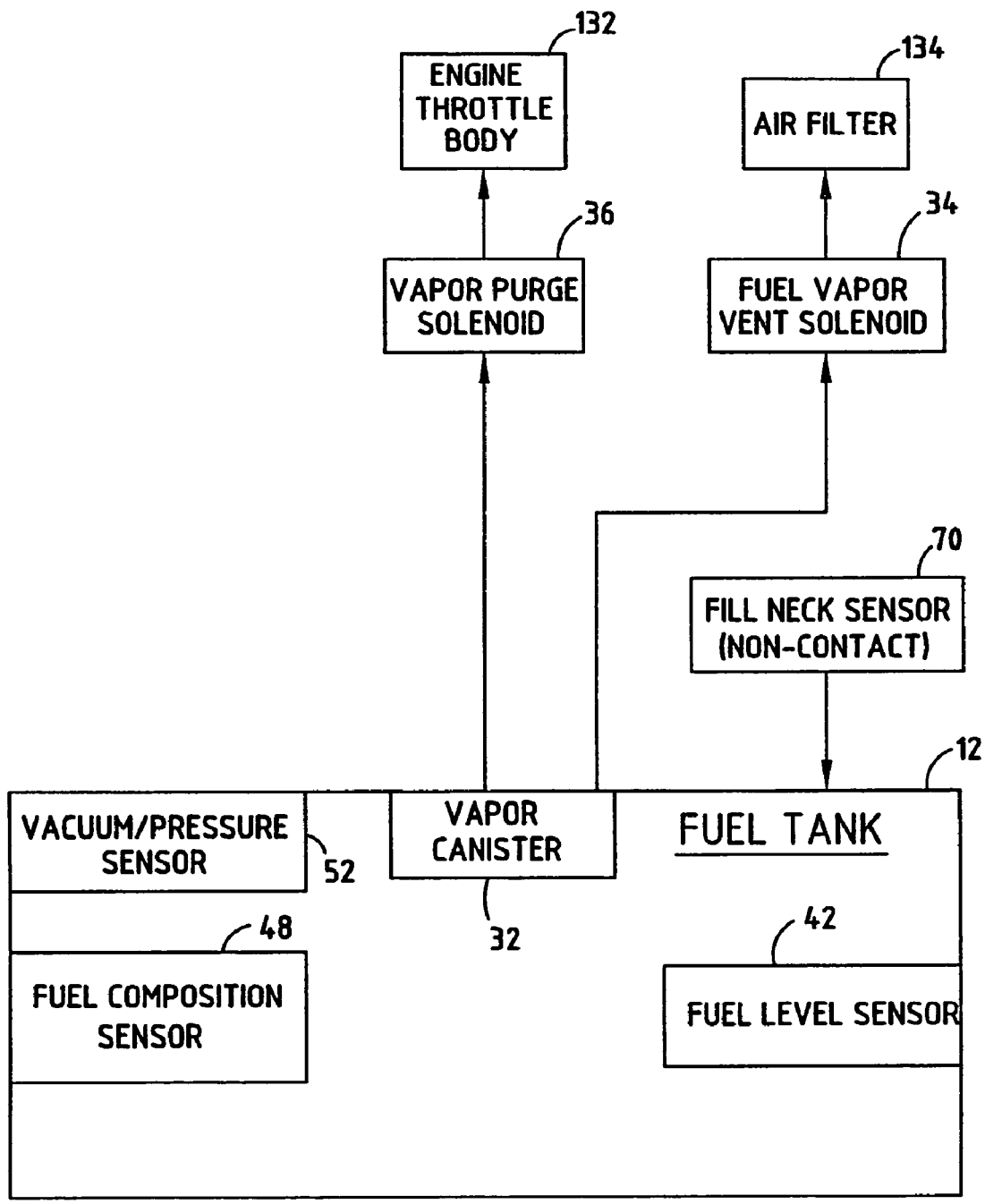
FIG. 15 is a block/flow diagram further illustrating the fuel vapor purge and vent functions of the fuel management system.

The fuel control module 40 further controls fuel venting, vapor purging, and fuel fill operations, and may control other functions related to the fuel management system 10. Referring to FIG. 15, the vapor collection canister 32 is shown within the fuel storage tank 12 communicating with the fuel vapor vent solenoid 34 and the vapor purge solenoid 36. The fuel vapor vent solenoid 34 is controlled in response to a command signal generated by the fuel control module 40 to open the fuel vapor vent solenoid 34 to allow gas to escape through an air filter 132 to the outside atmosphere, or vice versa. The fuel control module 40 likewise controls the vapor purge solenoid 36 to open the vapor purge solenoid 36 during a purge operation to allow the collected vapors be sent to the engine throttle body 132 for burning in the engine. In controlling the vent and purge operations, the fuel control module 40 receives various inputs including a tank pressure signal from the vacuum/pressure sensor 52, a fuel level signal from a fuel level sensor 42, and the fuel composition signal from the fuel composition sensor 48. The fuel control module 40 also controls and monitors the state of the fuel fill neck sensor 70 to further control the fuel fill operation.

Figure 16:
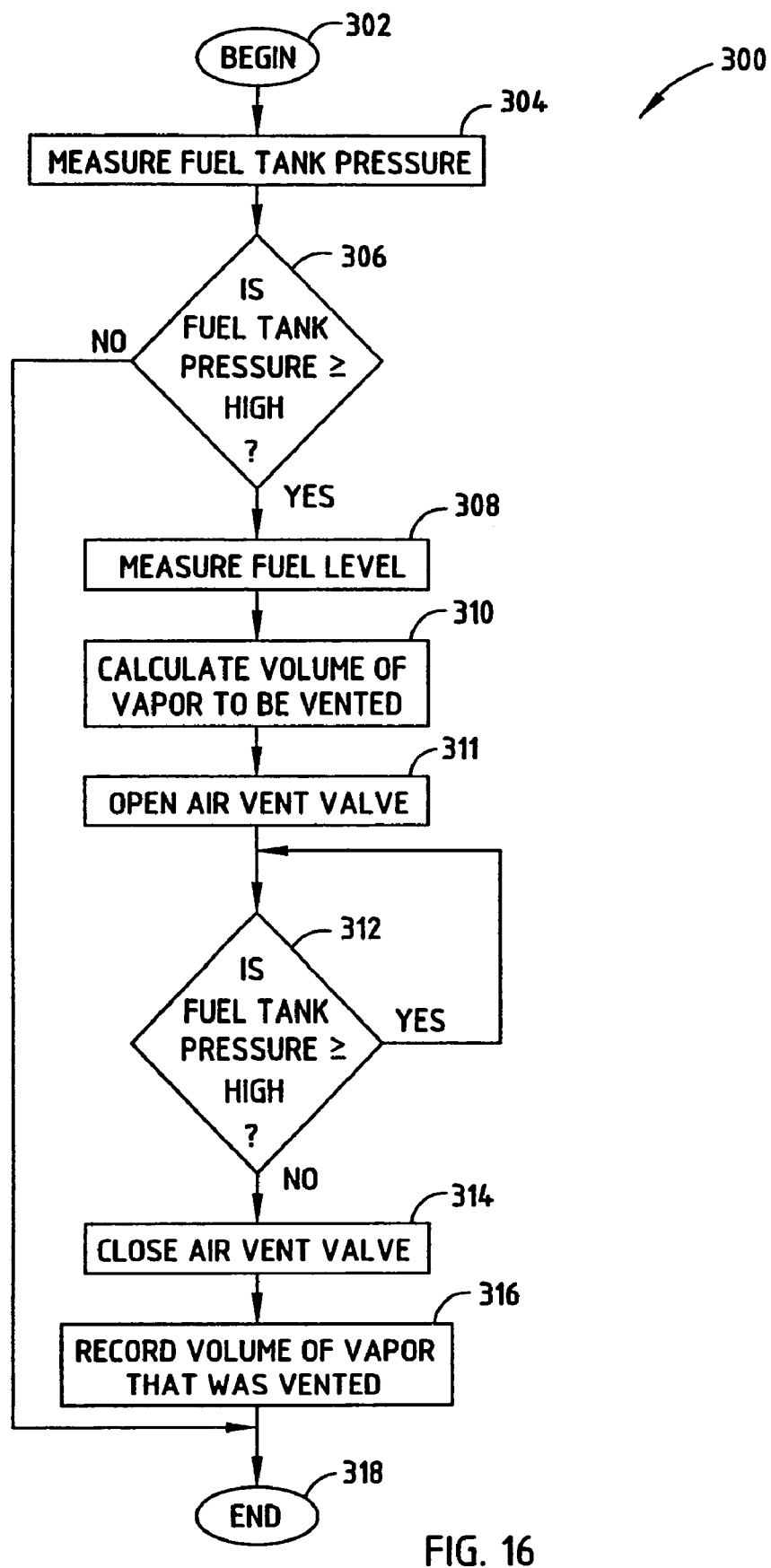
FIG. 16 is a flow diagram illustrating a vent control routine for controlling the fuel vapor vent actuator for venting vapor from the fuel storage tank.

Referring to FIG. 16, a vent control routine 300 that may be performed by fuel control module 40 for controlling the vent operation to maintain a desired pressure within the fuel storage tank 12 is illustrated therein. Beginning at step 302, the vent control routine 300 proceeds to measure the fuel tank pressure via the vacuum/pressure sensor (52) in step 304. In decision step 306, the measured fuel tank pressure is compared to a high-pressure limit and, if the fuel tank pressure does not exceed or equal the high-pressure limit, the vent control routine 300 ends at step 318. If the measured fuel tank pressure exceeds or is equal to the high-pressure limit, the vent control routine 300 proceeds to measure the fuel level in step 308, to calculate the volume of the vapor to be vented in step 310, and then commands opening of the air vent valve in step 311. With the air vent valve open, decision step 312 determines whether the fuel tank pressure remains higher than the high-pressure limit and, if so, continues to monitor this comparison in decision step 312 with the vent open. When the engine is operating and consuming fuel, the air vent valve is open to prevent a lack of airflow into the fuel storage tank so as to prevent a vacuum lock condition which could stall the engine. In addition, the air vent valve can be controlled to open and close to regulate the amount of air and gas coming into the fuel tank and escaping from the fuel tank. Once the measured fuel tank pressure is no longer greater than the high-pressure limit, vent control routine 300 proceeds to step 314 to close the air vent valve, and then records the volume of the vapor that was vented in step 316, before ending in step 318. Accordingly, the fuel control module 40 accurately controls the amount of vapor that is vented from the fuel storage tank 12 to relieve the fuel storage tank 12 of excessive pressure buildup.

Figure 17:
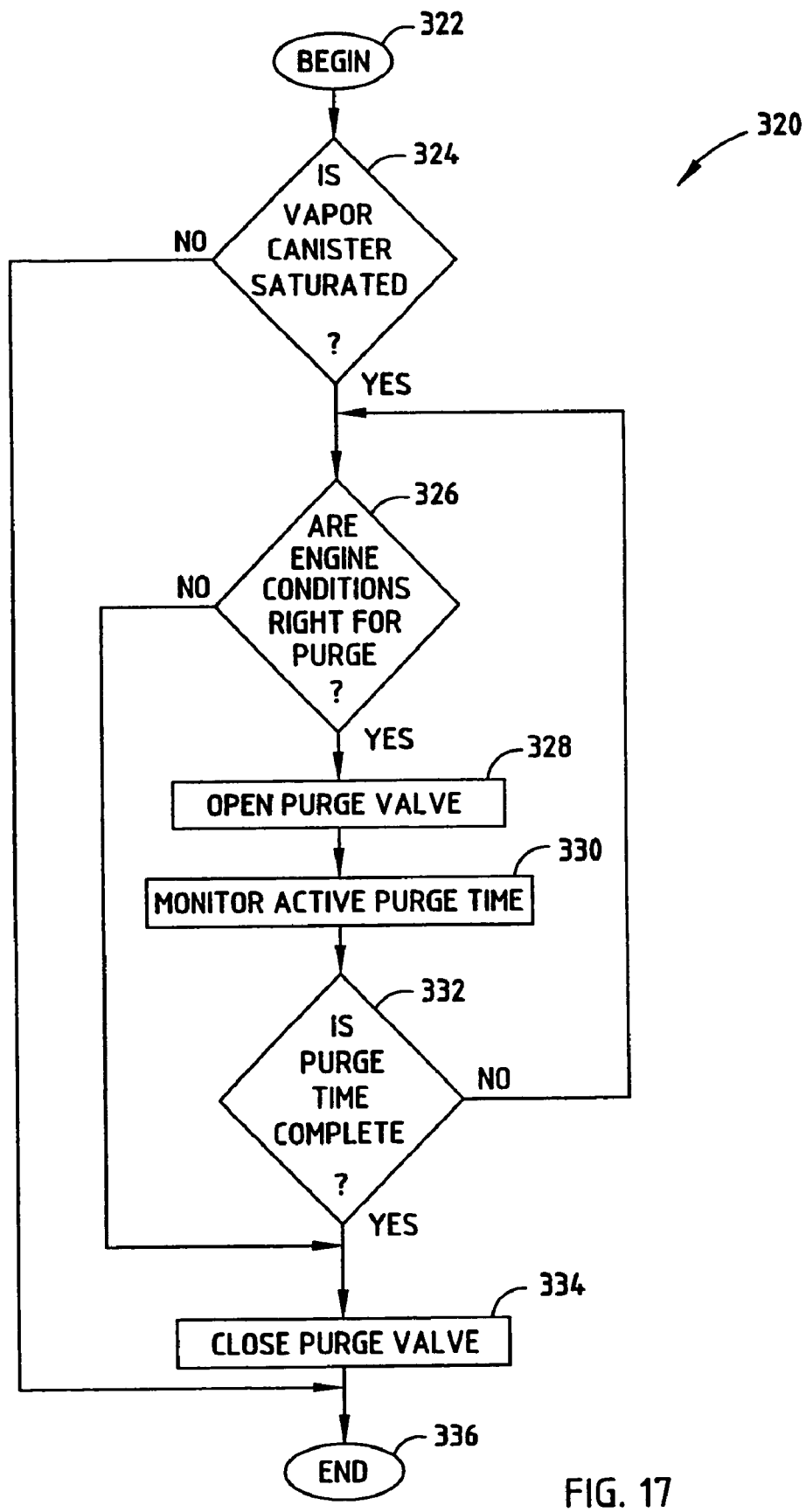
FIG. 17 is a flow diagram illustrating a purge control routine for controlling the fuel vapor purge actuator for purging fuel vapor from the fuel collection canister.

Referring to FIG. 17, a purge control routine 320 that may also be performed by fuel control module 40 for purging collected vapor from the evaporative emissions vapor collection canister is illustrated therein. Purge control routine 320 begins at step 322 and proceeds to determine if the vapor canister is saturated in decision step 324. The amount of saturation of the vapor collection canister can be determined the fuel fill routine and the number of venting cycles. If the vapor collection canister is not saturated, the purge control routine 320 ends at step 336. If the vapor collection canister is determined to be saturated, purge control routine 320 proceeds to decision step 326 to determine if the engine conditions are right for a purge operation. The right engine conditions for purge may include sufficient engine temperature, engine speed (RPM), elapsed time period elapsed from last purge, and time since vehicle start. If the right engine conditions for canister purge are not met, the purge control routine 320 proceeds to close the purge valve in step 334 and then ends in step 336.

If the right engine conditions for purge are met, the purge control routine 320 proceeds to open the purge valve in step 328 and then monitors the active purge time in step 330. Next, decision step 332 monitors whether the purge time is complete and, if not, continues to monitor the purge conditions and keep the purge valve open until the purge time is complete. Once the purge time is complete, purge control routine 320 proceeds to step 334 to close the purge valve and then ends at step 336. Accordingly, the fuel control module 40 is able to control the purge operation of the vehicle. However, the purge operation may require one or more command signals from the engine control module 82 to determine when the engine conditions are satisfied for a purge operation. It should also be appreciated that the fuel control module 40 may coordinate with the engine control module 82 such that either the engine control module 82 and/or fuel control module controls the purge operation.

Figure 18A:
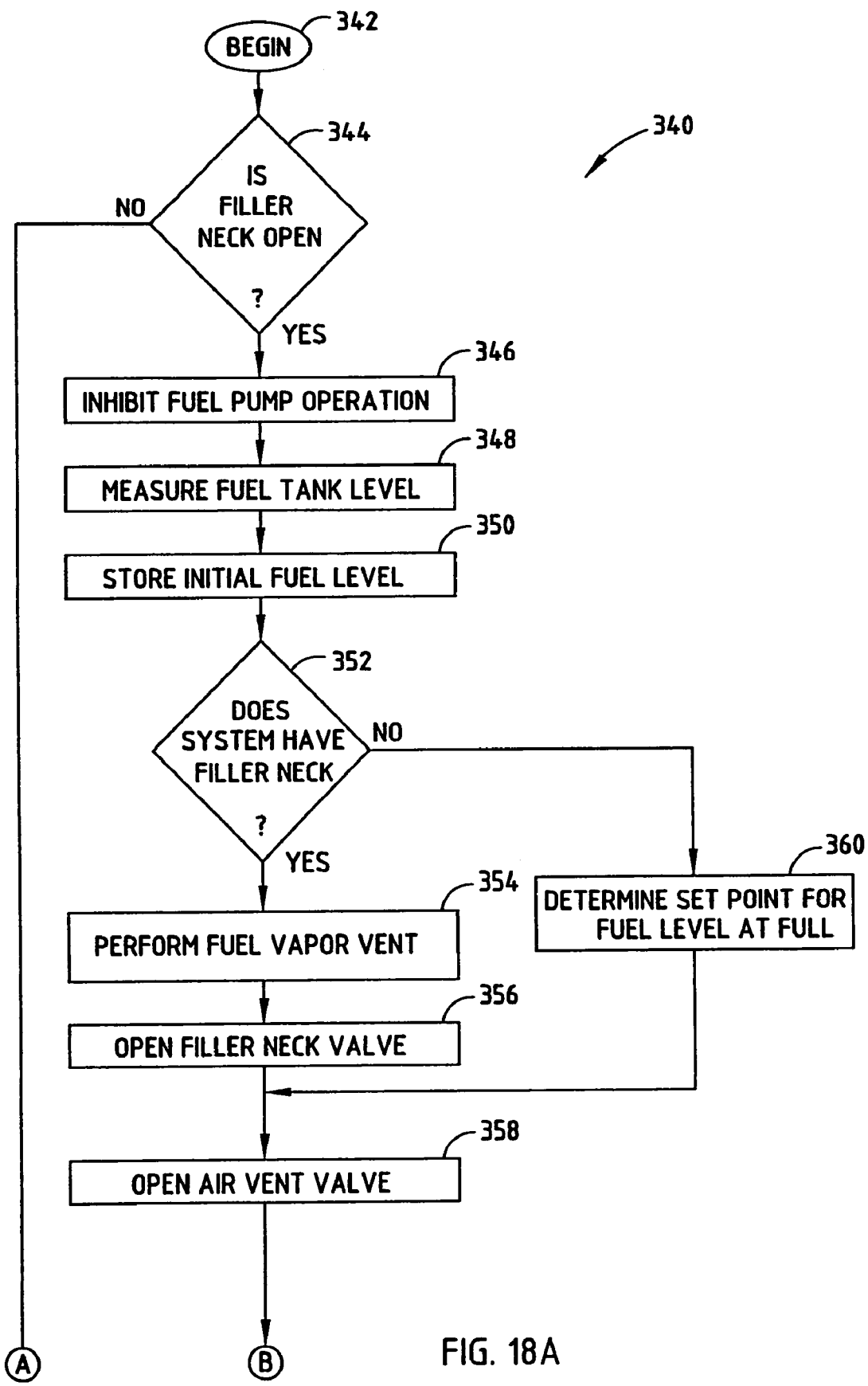
FIGS. 18A and 18B is a flow diagram illustrating a fuel fill control routine for controlling the fuel fill operation.
Figure 18B:
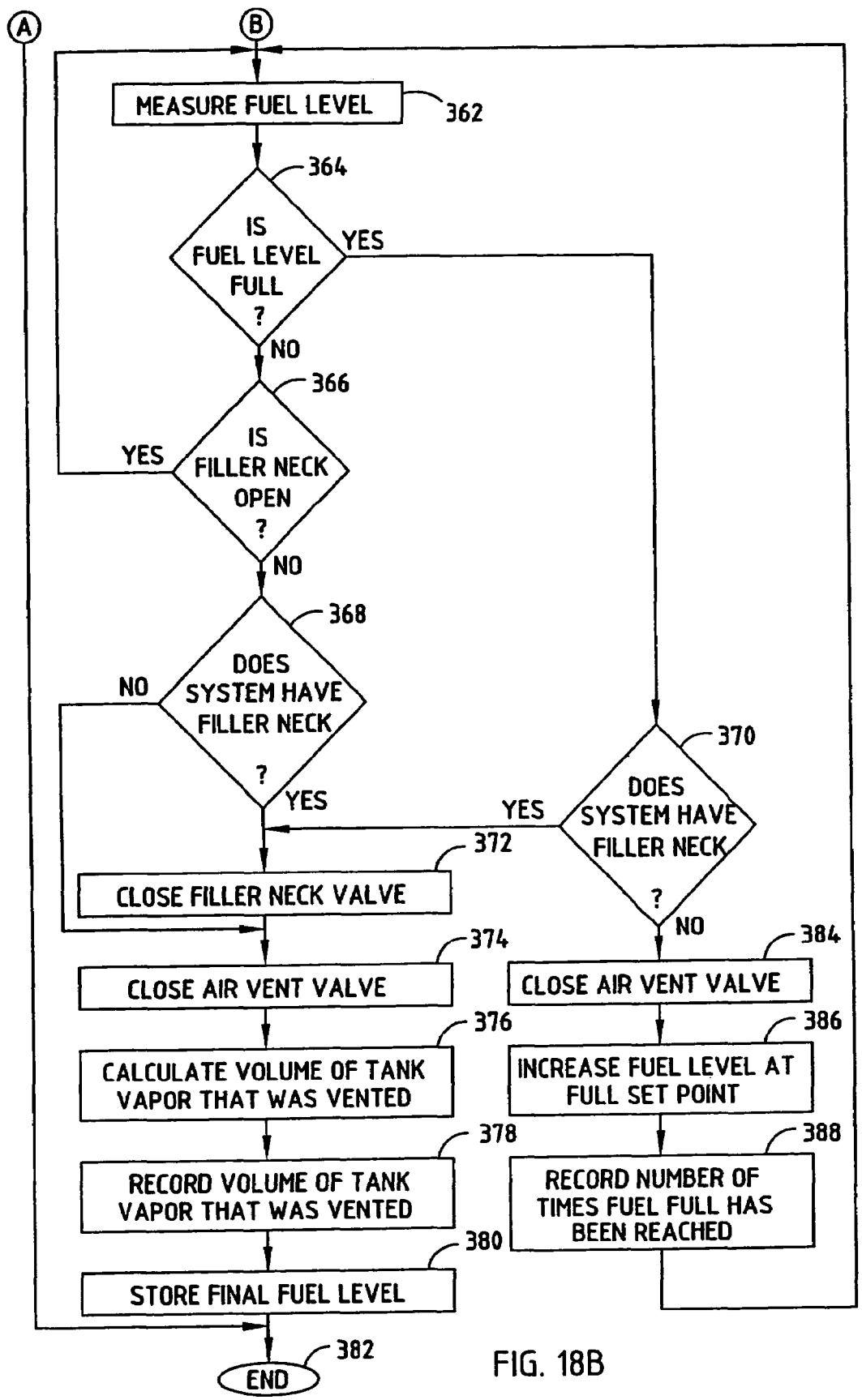

Referring to FIGS. 18A and 18B, a fuel fill control routine 340 that may be performed by the fuel control module 40 is illustrated for controlling the fuel fill operation for dispensing fuel into the fuel storage tank 12. The fuel fill control routine 340 begins at step 342 and proceeds to decision step 344 to determine if the fuel filler neck is open, which is indicative of a fuel fill dispensing nozzle being disposed within the fuel filler neck. The presence of the dispensing nozzle is sensed via the fuel fill sensor 70. If the fuel filler neck is not open, the fuel fill sequence ends at step 382. Accordingly, the fill control routine 340 may disallow the fuel fill operation to continue if the presence of a fuel fill dispensing nozzle is not detected. If the fuel filler neck is determined to be open, the fuel fill control routine 340 proceeds to step 346 to inhibit the fuel pump operation. Next, in step 348, the control routine 340 measures the initial fuel tank level via the tank level sensor, and, in step 350 stores the measured initial fuel level.

Next, in decision step 352, the fuel fill control routine 340 determines whether the vehicle system has a filler neck and, if so, first performs a fuel vapor vent operation in step 354, and then opens the filler neck valve in step 356. The fuel filler neck is a sensor and valve arrangement that eliminates the need for a fuel cap, as it creates the sealing of the fill tube. If the system does not have a filler neck, the fuel fill control routine 340 determines a set point for the fuel at the fuel level in step 358. Following steps 356 and 358, the fuel fill control routine 340 proceeds to open the air vent valve in step 360, and then measures the fuel level in step 362.

Proceeding to decision step 364, the fuel fill control routine 340 determines if the fuel level is full and, if the fuel level is full, then proceeds to decision step 370 to determine if the system has a filler neck. If the system does not have a filler neck, then fuel fill control routine 340 closes the air vent valve in step 384, increases the fuel level at the full set point in step 386, and then records the number of times that the fuel fill level has been reached in step 388, before returning back to step 362. If the system has a filler neck as determined in decision step 370, the fuel fill control routine 340 proceeds to step 372.

If the fuel level is determined in decision step 364 not to be full, the fuel fill control routine 340 proceeds to check if the filler neck is open in decision step 366 and, if the neck is open, returns to step 362. If the filler neck is not open, the fuel fill control routine 340 then checks for whether the system has a filler neck in decision step 368 and, if not, jumps forwards to step 374. If the system does have a filler neck, the fuel fill control routine 340 closes the fill neck valve first in step 372, before proceeding to step 374.

In step 374, the fuel fill control routine 340 closes the air vent valve, and then proceeds to calculate the volume of the tank vapor that was vented in step 376. The volume of the tank vapor that was vented is then recorded in step 378. Finally, the final fuel level is stored in memory in step 380, before ending the fuel fill control routine 340 in step 382. Accordingly, the fuel fill control routine 340 monitors the fuel fill operation and controls the fueling operation to prevent excessive fuel from being dispensed within the fuel storage tank so as to prevent saturation of the fuel collection canister. In doing so, the fuel fill control routine 340 may open and close the vent valve so as to create a pressure which causes the fuel fill dispensing nozzle to shut off. Further, if the fuel dispensing nozzle continues to inject fuel into the fuel storage tank, the fuel fill control routine 340 monitors the continued fuel injection. By monitor the fuel level and the characteristics of the fuel fill operation, the fuel control module 40 may determine when a purge operation should be performed. This fuel routing is used to reduce the evaporative emissions, which are created during the fueling operation, thus controlling the amount of prefills, but preventing the overfill of the system and venting which can otherwise occur in a manual fuel fill system.

Figure 19:
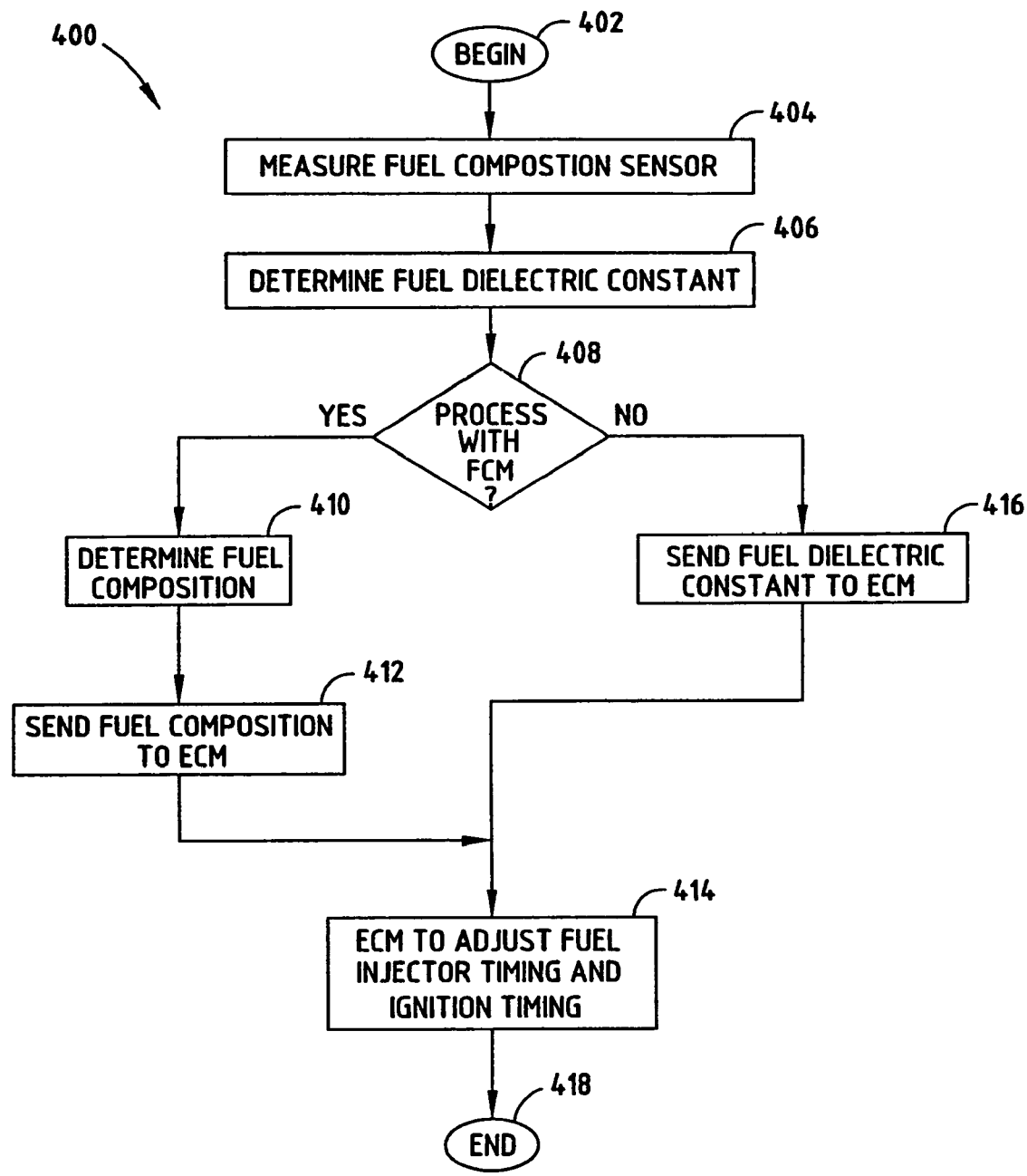
FIG. 19 is a flow diagram illustrating a routine of controlling engine fuel injection based on the sensed fuel composition.

Referring to FIG. 19, a fuel flex sensing control routine 400 is illustrated for sensing the composition of fuel to be injected into the engine and adjusting engine parameters based on the sensed fuel composition. The fuel composition sensing routine 400 begins at step 402 and proceeds to measure the fuel composition via the fuel composition sensor in step 404. In step 406, the fuel composition sensing routine 400 determines the dielectric constant of the fuel. Decision step 408 decides when the determined information is to be processed with the fuel control module 40. If the fuel dielectric constant is to be processed by the fuel control module 40, routine 400 proceeds to step 410 to determine the fuel composition at the fuel control module 40. Fuel composition information is then sent to the engine control module 82 in step 412. The engine control module 82 adjusts the fuel injector timing and ignition timing as a function of the fuel composition in step 414. Accordingly, the engine may be adjusted to compensate for changes in the composition of the fuel, particularly fuel containing various additives such as ethanol and alcohol which affect the optimal performance of the engine.

If the dielectric constant is determined in step 408 not to be processed by the fuel control module 40, the fuel dielectric constant is sent to the engine control module 82 in step 416, so that the engine control module 82 adjusts the fuel injection timing and ignition timing in step 414 as a function of the dielectric constant. Accordingly, either the fuel control module 40 or the engine control module 82 may determine the composition of the fuel and provide the composition information to the engine control module 82 to adjust engine operation based on the fuel composition.

Accordingly, the fuel management system 10 of the present invention advantageously provides for an integrated system employing a local fuel control module 40 in communication with various electronic sensors and devices related to fuel storage and delivery to provide enhanced fuel management on-board a vehicle. The fuel control module provides integrated control at a local level which lessens the processing capability required by the engine control module 82. By acquiring information local to the fuel storage and delivery system, the fuel control module 40 employs fewer electrical connections between the engine control module 82 and the fuel management related components. In addition, the fuel control module 40 advantageously provides for control of various functions of the vehicle including vent operations, purge operations, fuel fill operations, as well as enhanced variable speed fuel pump control.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of venting gas from within a fuel storage tank of a vehicle, said method comprising the steps of:
   sensing an internal pressure within the fuel storage tank;
   controlling a vent actuator as a function of the sensed internal pressure; and
   determining the volume of vapor vented from the fuel storage tank to a vapor collection canister due to actuation of the vent actuator.

2. The method as defined in claim 1, wherein the step of controlling the vent actuator comprises processing the sensed internal pressure with a local controller located separate from the engine controller, wherein the local controller generates a signal to control the vent actuator.

3. A method of venting a fuel storage tank in a vehicle, said method comprising the steps of:
   sensing a pressure within the fuel storage tank;
   controlling a vent actuator for venting fuel vapor to a vapor collection canister as a function of the sensed pressure;
   determining the volume of vapor vented from the fuel storage tank to said vapor collection canister; and
   pursing the collected fuel vapor from the vapor collection canister based on the volume of vapor so vented for burning in the engine.

4. The method of claim 1 additionally comprising purging the fuel vapor collected in the vapor collection canister based on the volume of vapor vented into the canister.

5. The method of claim 4 wherein the purging is performed by burning the vapor in the canister within a vehicle engine.

* * * * *